(12) United States Patent
Nodhturft et al.

(10) Patent No.: US 12,690,562 B2

(45) Date of Patent: Jul. 28, 2026

(54) ENVIRONMENT-CONTROLLED PET SHELTER

(71) Applicant: Paws Up Pet Products, LLC, Gainesville, FL (US)

(72) Inventors: Virginia Nodhturft, Temple Terrace, FL (US); Philip Nodhturft, III, Gainesville, FL (US); Jacob Morrise, Lehi, UT (US)

(73) Assignee: PAWS UP PET PRODUCTS, LLC, Gainesville, FL (US)

( * ) Notice: Subject to any disclaimer, the term of this patent is extended or adjusted under 35 U.S.C. 154(b) by 0 days.

(21) Appl. No.: 19/058,862

(22) Filed: Feb. 20, 2025

(65) Prior Publication Data

US 2025/0185621 A1 Jun. 12, 2025

Related U.S. Application Data

(63) Continuation-in-part of application No. 17/945,378, filed on Sep. 15, 2022, now abandoned.

(60) Provisional application No. 63/244,308, filed on Sep. 15, 2021.

(51) Int. Cl.
*A01K 1/03* (2006.01)

(52) U.S. Cl.
CPC .................................... *A01K 1/033* (2013.01)

(58) Field of Classification Search
CPC .............................................. A01K 1/033–034
USPC ................................................ 119/498–501
See application file for complete search history.

(56) References Cited

U.S. PATENT DOCUMENTS

| | | | | |
|---|---|---|---|---|
| 2,830,606 | A | * | 4/1958 | Daugherty .............. E04H 15/20 52/2.14 |
| 3,872,832 | A | * | 3/1975 | Quinn .................. A01K 1/0107 119/165 |
| 3,942,306 | A | * | 3/1976 | Kulka .................... A01K 1/035 54/80.2 |
| 3,962,993 | A | * | 6/1976 | Dattilo .................. A01K 1/033 119/500 |
| 4,161,924 | A | * | 7/1979 | Welker .................. A01K 1/033 119/784 |
| 4,162,393 | A | * | 7/1979 | Balboni .................. H05B 3/36 219/217 |
| 4,177,761 | A | * | 12/1979 | Bellocchi, Jr. ......... A01K 1/033 119/482 |

(Continued)

FOREIGN PATENT DOCUMENTS

KR 102673883 B1 * 6/2024 ............. A01K 1/035

*Primary Examiner* — Morgan T Jordan
(74) *Attorney, Agent, or Firm* — Simpson & Simpson, PLLC

(57) ABSTRACT

An animal shelter comprising one or more side panels having an outer wall and an inner wall, whereby an air pocket is formed between the outer wall and the inner wall, a door hingedly connected to one of the one or more side panels, a sound absorbing baffle located within one of the one or more side panels, the baffle operatively arranged to allow air to flow in or out of the animal shelter, one or more top panels coupled to the one or more side panels, the top panels having an outer wall and an inner wall, whereby an air pocket is formed between the outer wall and the inner wall, and a bottom panel coupled to the one or more side panels, wherein the one or more side panels, the one or more top panels, and the bottom panel create a substantially enclosed area.

15 Claims, 23 Drawing Sheets

(56)                References Cited

U.S. PATENT DOCUMENTS

| | | | | |
|---|---|---|---|---|
| 4,649,861 A * | 3/1987 | Elkins | A01M 1/14 | 119/28.5 |
| 4,696,257 A * | 9/1987 | Neary | A01K 1/0114 | 119/500 |
| 4,852,517 A * | 8/1989 | Smith | A01K 1/0353 | 119/28.5 |
| 4,858,561 A * | 8/1989 | Springer | A01K 1/0107 | 160/368.1 |
| 4,883,172 A * | 11/1989 | Young | H01L 21/67363 | 361/212 |
| 4,962,729 A * | 10/1990 | Barreto | A01K 1/033 | 119/482 |
| 5,148,768 A * | 9/1992 | Hinton | A01K 1/0107 | 119/500 |
| 5,184,568 A * | 2/1993 | Healey | A01K 15/024 | 119/482 |
| 5,525,411 A * | 6/1996 | Stewart | B60N 2/5866 | 442/56 |
| 5,551,371 A * | 9/1996 | Markey | A01K 1/033 | 119/482 |
| 5,575,239 A * | 11/1996 | Bradburn | A01K 1/033 | 119/500 |
| 5,685,257 A * | 11/1997 | Feibus | A01K 1/0353 | 5/652 |
| 5,727,501 A * | 3/1998 | York | A01K 1/033 | 119/497 |
| 5,964,190 A * | 10/1999 | Willinger | A01K 1/033 | 119/500 |
| 6,196,156 B1 * | 3/2001 | Denesuk | D06M 16/00 | 5/636 |
| 6,410,994 B1 * | 6/2002 | Jones | H01R 13/514 | 307/42 |
| 6,591,560 B2 * | 7/2003 | Burke, III | E04F 15/02 | 52/177 |
| 6,745,788 B1 * | 6/2004 | Brown | E06B 7/32 | 160/180 |
| 6,801,418 B1 * | 10/2004 | Epstein | A61N 1/14 | 361/58 |
| 6,868,803 B1 * | 3/2005 | Little | A01K 1/033 | 119/482 |
| 7,302,914 B1 * | 12/2007 | Wehby | A01K 1/033 | 119/500 |
| 7,578,264 B2 * | 8/2009 | Guard | A01K 1/033 | 119/482 |
| 7,997,234 B1 * | 8/2011 | Hughey | A01K 1/0245 | 119/500 |
| 8,944,010 B2 * | 2/2015 | Willard | A01K 1/033 | 119/498 |
| 10,208,975 B2 * | 2/2019 | Azevedo | H05B 47/115 | |
| 10,791,701 B2 * | 10/2020 | Zemet | A01K 1/034 | |
| 2002/0152969 A1 * | 10/2002 | Grigsby | F24F 1/0071 | 119/500 |
| 2004/0139923 A1 * | 7/2004 | Axelrod | A01K 1/0245 | 119/498 |
| 2005/0039693 A1 * | 2/2005 | Hung | A01K 1/033 | 119/500 |
| 2005/0076854 A1 * | 4/2005 | Passno | A01K 1/03 | 119/500 |
| 2005/0278863 A1 * | 12/2005 | Bahash | A47C 21/044 | 5/652.2 |
| 2006/0260558 A1 * | 11/2006 | Wu | A01K 1/033 | 119/498 |
| 2007/0107662 A1 * | 5/2007 | Queen | A47G 27/0206 | 119/28.5 |
| 2008/0029043 A1 * | 2/2008 | Lawrence | A01K 1/0245 | 119/501 |
| 2009/0223463 A1 * | 9/2009 | Chem | A01K 1/033 | 119/500 |
| 2010/0242856 A1 * | 9/2010 | Willard | A01K 1/033 | 119/501 |
| 2011/0126775 A1 * | 6/2011 | Seltzer | A01K 1/033 | 119/500 |
| 2014/0261190 A1 * | 9/2014 | Landers | B29C 63/0026 | 156/60 |
| 2015/0034018 A1 * | 2/2015 | Edmonds | A01K 1/0245 | 119/496 |
| 2017/0097169 A1 * | 4/2017 | Azevedo | G05B 15/02 | |
| 2017/0172103 A1 * | 6/2017 | Lee | A01K 1/0353 | |
| 2018/0064060 A1 * | 3/2018 | Romney | G07C 9/29 | |
| 2018/0092329 A1 * | 4/2018 | Zemet | A01K 1/034 | |
| 2019/0069510 A1 * | 3/2019 | Otero | H04R 1/028 | |
| 2019/0098860 A1 * | 4/2019 | Gaskill | H05F 3/02 | |
| 2019/0357495 A1 * | 11/2019 | Liu | A01K 29/00 | |

* cited by examiner

100

310

320

700

120

1120

ANTI-STATIC STRAP ON THE BOTTOM OF THE PILLOW

BACK PORTION OF THE SHELTER

1100

1110

1130

700

BACK OF SHELTER

MAT

1120

ALLIGATOR CLIP        1130

100

700

ENVIRONMENT-CONTROLLED PET SHELTER

CROSS-REFERENCE TO RELATED APPLICATIONS

This application is a continuation-in-part application, filed under 35 U.S.C. § 111(a) and § 120, of U.S. patent application Ser. No. 17/945,378, filed on Sep. 15, 2022, which application is a non-provisional patent application claiming priority to U.S. Provisional Patent Application No. 63/244,308, filed on Sep. 15, 2021, which applications are incorporated herein in their entireties by reference.

TECHNICAL FIELD

The present disclosure generally relates to a shelter called for domesticated animals, and more particularly to an environment-controlled pet shelter that may provide relief to animals during thunderstorms and other loud events such as fireworks shows.

BACKGROUND

Dogs can generally hear sounds that are between −5 dB and −15 dB on average, which means dogs can hear sounds that are not loud enough for human ears. Dogs' ears have much higher sensitivity than human ears. In fact, a dog often hears sounds long before humans do. A dog's ears evolved to tune in high-pitched sounds of their prey. Their ears can detect the high-pitched squeak of a mouse venturing out of its den, for example. Dogs can also hear much softer sounds than humans can. While a young human can hear sounds at 0 decibels (dB)—the measure of intensity or loudness of a sound—dogs can hear low sounds at −5 to 15 dB. For instance, it might seem that your dog is psychic and knows when your spouse is returning home from work minutes before they pull into the driveway. However, the dog is probably hearing a high-pitched engine sound from a few blocks away or the low hum of the engine long before it enters your range of hearing.

Although the increased sensitivity of a dog's ears provides many advantages, it also results in discomfort when a dog hears very loud noises or sounds at a particular frequency. For example, many dogs will display symptoms when the audio frequency is hurtful to his ears. Tell-tale signs cited by the University of Illinois at Urbana-Champaign College of Veterinary Medicine include: quivering, shaking, or trembling; whining; crawling in their owner's lap or following their owner closely; drooling; restlessness or pacing; barking; hypervigilance; and trying to escape confined areas. Sounds in the range of 70-90 dB begin to damage hearing, and sounds above 100 dB can cause great damage to hearing. For example, that the sound of thunder at 120 dB and fireworks at 160 dB are so loud that they are in the range of damaging human ears and in the range of being very painful to a dog's ears, and can actually tear or rupture a dog's ear drum.

Due in part to how loud thunderstorms can be, thunderstorm phobia, or anxiety in dogs, is a fairly common and very real problem for many dogs. Dogs with thunderstorm phobia become extremely frantic and overwhelmed with fear during storms. Astraphobia is the technical term for this fear: the fear of thunder and lightning. Owners who see their dogs experiencing this fear usually feel helpless and frustrated. Almost 50 percent of dog owners surveyed in the New Zealand Veterinary Journal reported that their dogs were fearful during fireworks. Meanwhile, other data, published in October 2015 in Applied Animal Behavior Science, suggests that fireworks frighten dogs even more than gunshots or thunderstorms.

The hearing of many animals is much more sensitive than it is in humans, so the explosions of fireworks are not only more disturbing to them, but such explosions can also damage their hearing more severely. Fireworks can emit sounds of up to 190 decibels (110 to 115 decibels above the range of 75 to 80 decibels where the damage to the human ear begins). Fireworks generate a higher noise level than gunshots (140 decibels), and some jet planes (100 decibels). Noises caused by fireworks and firecrackers can lead to loss of hearing and tinnitus. Dogs are known to suffer irreversible hearing loss caused by proximity to the noise of gunfire. In addition to these harms, the noises caused by fireworks harm animals by causing fear. In fact, repeated exposure to unexpected, unpredictable loud noises can cause phobias in many animals, increasing panic reactions to loud noises in the future. Accordingly, there is a need to protect dogs or other animals from the harm caused by loud noises associated with thunderstorms, fireworks, and other events.

Loud noises are not the only characteristic of thunderstorms that may be harmful to dogs. As air warms and expands, or as clouds form and lower into the atmosphere, the barometric pressure will change. Stormy weather can cause the pressure to drop, while fair weather can typically help maintain a rising barometric pressure. Studies on humans, have shown barometric pressure changes cause numerous physical, emotional, and behavioral changes, including headaches, mood variations, and complaints about more aches and pains. Some people get headaches prior to storms because of the relative pressure of the atmosphere on their sinuses, which are filled with air. Veterinarians theorize that dogs may also experience headaches or other discomfort caused by a drop in barometric pressure because dogs' sinuses are filled with air like human sinuses. In fact, a dog with a longer snout and a larger sinus cavity may feel the effects of barometric pressure more intensely than humans, which have a smaller sinus cavity.

In addition, changes in barometric pressure may also cause a dog's nose to become congested, and create discomfort by putting pressure on their joints and sinuses. Pressure drops may also change the way scents travel through the air. The scents in the air travel like they are in slow motion and have a peculiar odor alerting the dog that something bad is coming. The normal barometric pressure is roughly 29.7-30.9 inHg or roughly 1005.7 mbar to 1046.4 mbar. Anything below 29.7 inHg has a significant impact on the dog. Changes in barometric pressure can create congestion in the dog's nose and interfere with the way the dog picks up scents of danger, prey, or the mood of the pet owner, and creates extreme anxiety. Therefore, there is a need for a way to regulate the barometric pressure experienced by a dog to reduce discomfort.

Dogs also experience discomfort caused by static electricity. During a thunderstorm, static electricity in the clouds builds up, eventually bursting into lightning. Dogs can sense this static electricity, even from inside our homes, and often even before the storm reaches our own neighborhood.

Furthermore, during a thunderstorm static electricity in the atmosphere collects under the dander of the pet, discharging numerous and very painful electrical shocks. This sometimes leads to animals running to grounded areas like basements, bathtubs, and toilets.

In addition to the static electricity felt by dogs through their fur during a thunderstorm, the ions in the atmosphere change. Dogs may experience the changed ions, as increased vigilance and external signals travel through their nervous system more quickly. These signals include the "sounds of rain and thunder, and flashing lights," and this also explains why the dog goes in search of a way to ground himself. The dog often goes in the bathroom seeking relief in the sink, toilet, bathtub and shower. Therefore, there is a need for a way of protecting dogs from discomfort caused by static electricity and atmospheric changes often associated with thunderstorms.

Another consideration that is important to the health of an animal, including dogs, is the airflow and ventilation of the environment the animal is in. A properly ventilated and circulated area for an animal has several benefits. Insufficient airflow can make an animal feel agitated and restless. Further, a lack of airflow can make breathing more difficult and increases the potential risk of respiratory issues. Therefore, there is a need to provide adequate airflow around an animal, while also providing an environment that will lessen the negative effects of thunderstorms and other loud events such as fireworks shows that may impact the health of an animal.

Lastly, while acoustic transmission loss may be accomplished through the wall of a structure, the inclusion of noise within a structure may also lessen the negative effects of the loud sounds of thunderstorms and other loud events such as fireworks shows on an animal. Noise within a structure can mask sounds from outside the structure. A constant sound within a structure makes it harder for an animal to discern sudden loud noises emanating from outside the structure. Therefore, there is a need to provide an area for an animal that contains noise within the area, for example through the use of the noise of a fan or speaker, to decrease the negative effects of the loud sounds of thunderstorms and other loud events such as fireworks shows may have on an animal.

SUMMARY

According to an aspect of one or more example embodiments, a protective animal shelter is provided that may protect an animal within the shelter from discomfort or harm caused by one or more of loud noises, changes in barometric pressure, and static electricity.

The shelter may include one or more side panels creating a substantially enclosed area, a bottom panel coupled to the one or more side walls, a fan coupled to the animal shelter and configured to direct air into the substantially enclosed area. sound-absorbing foam coupled to the one or more side panels, and a grounding mat coupled to the bottom panel of the shelter, and configured to dissipate static charge. The grounding mat may include a wire coupled to a plug having a ground prong that is configured to be plugged into a surge protector to dissipate the static charge.

The animal shelter may include a grounded pillow configured to be disposed above the bottom panel. The fan may be configured to be coupled to a top portion of the animal shelter. The animal shelter may include a door configured to allow an animal to enter and exit the animal shelter. The fan may be configured to be coupled to the door or at the top of the shelter directing cold air into the shelter thereby elevating the barometric pressure. A sound deadening material may be coupled to an interior side of the sound-absorbing foam, and a first sound blocking material layer may be coupled to an interior side of the sound deadening material. A second sound blocking material layer may be coupled to an exterior side of the sound-absorbing foam. The grounding pillow may include an anti-static strap configured to be coupled to the grounding mat to dissipate static charge.

According to another example embodiment, an animal shelter for reducing noise experienced by an animal is provided, and may include one or more side walls creating a substantially enclosed area, a bottom panel coupled to the one or more side walls, and a grounding mat coupled to the bottom panel of the shelter, and configured to dissipate static charge. At least one of the one or more side panels and bottom panel may include an exterior layer of sound-absorbing foam.

The at least one of the one or more side panels and bottom panel may also include a middle layer of sound deadening material, an interior layer of sound blocking material, and an outer layer of sound blocking material, that is disposed outside of the exterior layer. The animal shelter may include a fan coupled to the animal shelter and configured to direct air into the substantially enclosed area. The grounding mat may include a wire coupled to a plug having a ground prong that is configured to be plugged into a surge protector to dissipate the static charge. The animal shelter may also include a grounded pillow configured to be disposed above the bottom panel. The fan may be configured to be coupled to a top portion of the animal shelter. The grounding pillow may include an anti-static strap configured to be coupled to the grounding mat to dissipate static charge.

According to another example embodiment, the animal shelter comprises one or more side panels, the side panels having an outer wall and an inner wall, whereby an air pocket is formed between the outer wall and the inner wall, a door hingedly connected to one of the one or more side panels, the door configured to allow an animal to enter and exit the animal shelter, a sound absorbing baffle located within one of the one or more side panels, the baffle operatively arranged to allow air to flow in or out of the animal shelter, one or more top panels coupled to the one or more side panels, the top panels having an outer wall and an inner wall, whereby an air pocket is formed between the outer wall and the inner wall, a bottom panel coupled to the one or more side panels, wherein the one or more side panels, the one or more top panels, and the bottom panel create a substantially enclosed area, one or more vibration damping feet coupled to the bottom panel, a fan coupled to the animal shelter, the fan configured to circulate air within the substantially enclosed area, the fan further configured to introduce sound into the substantially enclosed area, a speaker coupled to the animal shelter, the speaker configured to introduce sound into the substantially enclosed area, a grounding mat coupled to the bottom panel of the shelter, the grounding mat configured to dissipate static charge via a conductor connected to ground, and, a surge protector electrically connected to the ground and to the grounding mat, the surge protector operatively arranged to protect the grounding mat and an animal in contact therewith from a lightning strike upon a house in which the animal shelter is located.

In some embodiments, the present invention comprises the aforementioned animal shelter, wherein the door comprises an outer wall and an inner wall, whereby an air pocket is formed between the outer wall and the inner wall.

In some embodiments, the present invention comprises the aforementioned animal shelter, wherein the door further comprises a flexible gasket having an embedded magnetic strip therein.

In some embodiments, the present invention comprises the aforementioned animal shelter, wherein the one or more side panels comprises a ferromagnetic strip, wherein when the door is in a closed position, the flexible gasket having an embedded magnetic strip is magnetically releasably coupled to the ferromagnetic strip.

In some embodiments, the present invention comprises the aforementioned animal shelter, wherein the speaker is configured to receive audio signals transmitted wirelessly.

According to another example embodiment, the animal shelter comprises one or more side panels, the side panels having an air pocket therein, a door hingedly connected to one of the one or more side panels, the door having an air pocket therein, one or more top panels coupled to the one or more side panels, the top panels having an air pocket therein, a bottom panel coupled to the one or more side panels, wherein the one or more side panels, the one or more top panels, and the bottom panel create a substantially enclosed area, a grounding mat coupled to the bottom panel of the shelter, and configured to dissipate static charge via a conductor connected to ground, and, a surge protector electrically connected to the ground and to the grounding mat, the surge protector operatively arranged to protect the grounding mat and an animal in contact therewith from a lightning strike upon a house in which the animal shelter is located.

In some embodiments, the present invention comprises the aforementioned animal shelter further comprising a sound absorbing baffle located within one of the one or more side panels, the baffle operatively arranged to allow air to flow in or out of the animal shelter.

In some embodiments, the present invention comprises the aforementioned animal shelter further comprising one or more vibration damping feet coupled to the bottom panel.

In some embodiments, the present invention comprises the aforementioned animal shelter further comprising a fan coupled to the animal shelter, the fan configured to circulate air within the substantially enclosed area and further configured to introduce sound into the substantially enclosed area.

In some embodiments, the present invention comprises the aforementioned animal shelter further comprising a speaker coupled to the animal shelter, the speaker configured to introduce sound into the substantially enclosed area.

In some embodiments, the present invention comprises the aforementioned animal shelter, wherein the speaker is configured to receive audio signals transmitted wirelessly.

A general object of the present invention is to provide an animal shelter that has adequate airflow for the health of an animal, while also providing an environment that will lessen the negative effects of thunderstorms and other loud events such as fireworks shows that may impact an animal.

A further object of the present invention is to provide an animal shelter that maximizes acoustic transmission loss, decreasing the sound intensity of thunderstorms and other loud events such as fireworks shows experienced by an animal while inside the animal shelter.

A further object of the present invention is to provide an animal shelter the utilizes noise within the shelter, for example the noise of a fan or speaker, to decrease the negative effects of the loud sounds of thunderstorms and other loud events such as fireworks shows that may impact an animal.

These and other objects, features, and advantages of the present invention will become readily apparent upon a review of the following detailed description of the invention, in view of the drawings and appended claims.

BRIEF DESCRIPTION OF DRAWINGS

A more complete understanding of the present embodiments, and the attendant advantages and features thereof, will be more readily understood by reference to the following detailed descriptions when considered in conjunction with the accompanying drawings wherein.

DETAILED DESCRIPTION OF EXAMPLE EMBODIMENTS

Figure 1:
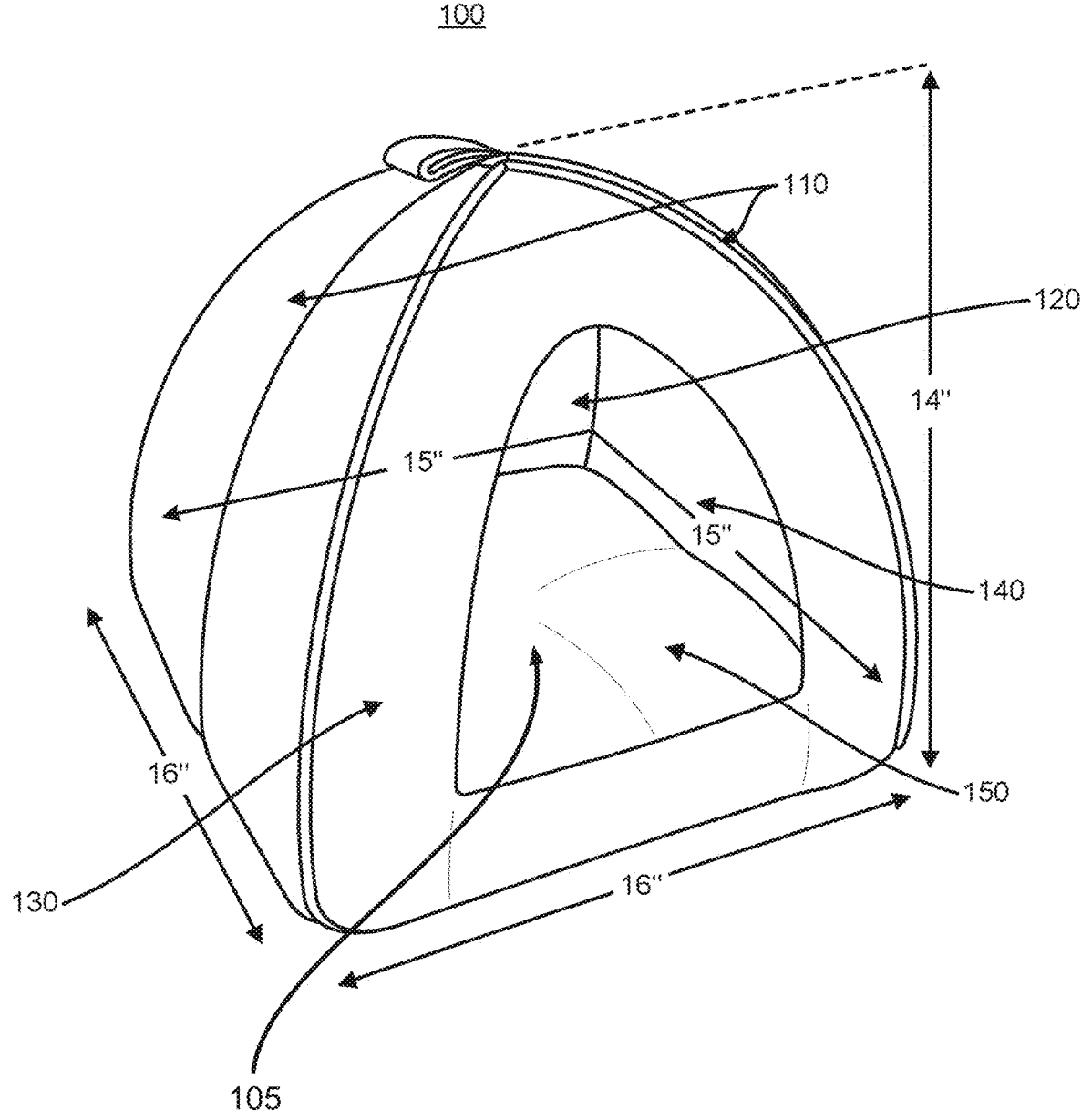
FIG. 1 shows a protective animal shelter according to an example embodiment.

Reference will now be made in detail to the following example embodiments, which are illustrated in the accompanying drawings, wherein like reference numerals refer to like elements throughout. The example embodiments may be embodied in various forms without being limited to the example embodiments set forth herein. Descriptions of well-known parts are omitted for clarity.

FIG. 1 shows a protective animal shelter 100 according to an example embodiment. The shelter 100 may include one or more side panels 110 creating a substantially enclosed area 105, a back panel 120, and a front panel 130 with an opening 140 for the animal to enter and exit the shelter. The shelter 100 may also include a cover (not shown) for the opening that is configured to prevent an animal from exiting the shelter when the cover is closed. For example, the cover may be coupled to the shelter 100 using hook and loop strips, a zipper, or other connecting mechanism. The cover may also be made of a mesh material or other breathable material to provide ventilation. The shelter 100 may also include a bottom panel 150 that is coupled to the one or more side panels 110, the back panel 120, and the front panel 130. In the example embodiment shown, the one or more side panels 110, the back panel 120, and the front panel 130 converge at a point at the top of the shelter 100, however the shelter may alternatively include a roof panel that is coupled to the one or more side panels, the back panel 120, and the front panel 130. The shelter 100 may be any shape or size, and may include any number of side, back, or front panels, and any number of openings.

Figure 2:
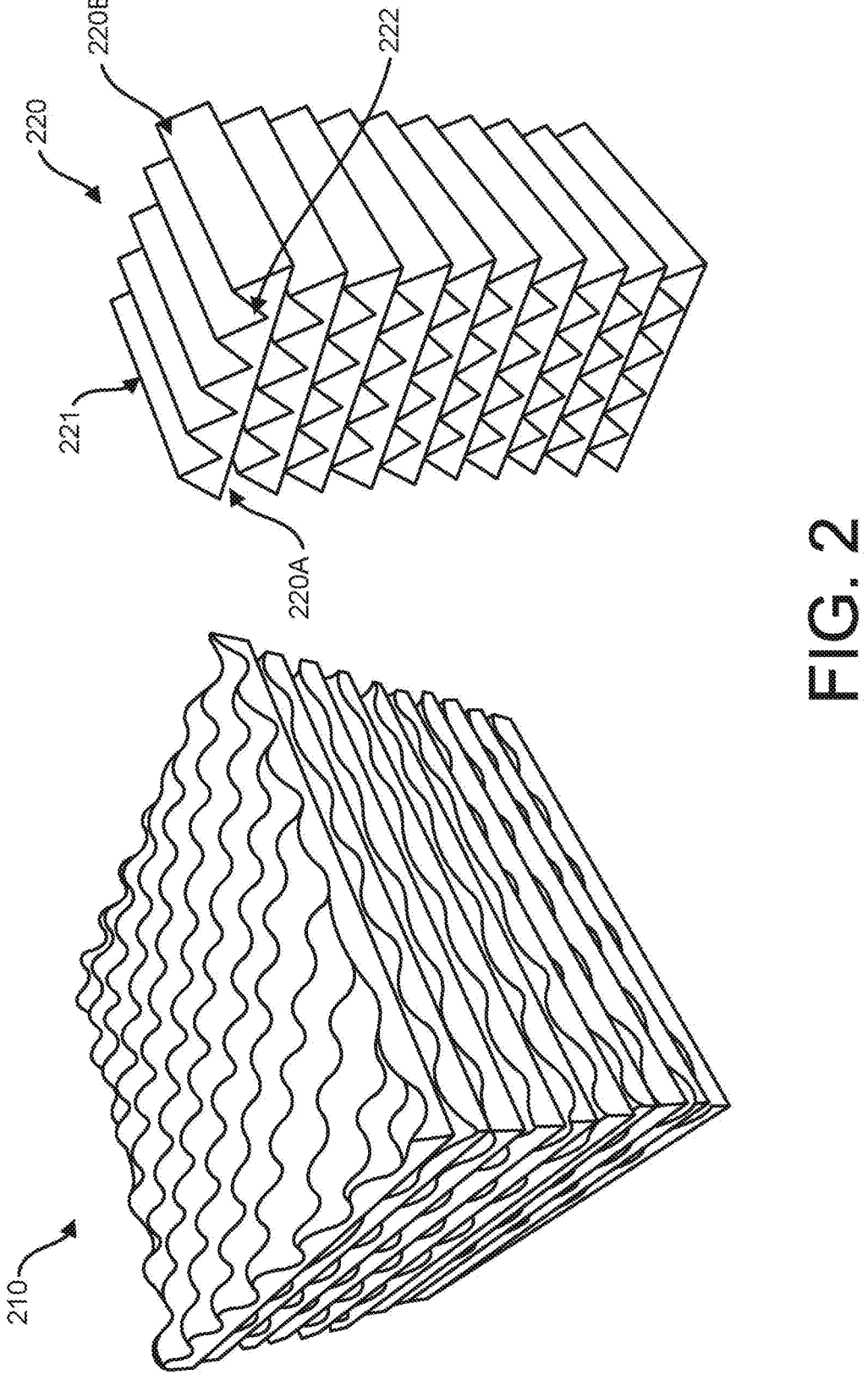
FIG. 2 shows sound absorbing foam according to an example embodiment.

The shelter 100 according to an example embodiment may also include sound absorbing foam to reduce the amount of sound heard by the animal when inside the shelter. FIG. 2 shows two example embodiments of sound absorbing foam made of polyurethane that may be used: an egg crate foam 210, and a saw-toothed foam 220. The egg crate foam 210 may include alternating peaks and valleys that form a wave-like formation, while the saw-toothed foam 220 may have a triangular cross-section that includes alternating protruding portions 221 and recessed portions 222. The sound absorbing foam may be affixed on the outer and/or inner surfaces of the side panels 110, back panel 120, and front panel 130 of the shelter 100. The sound absorbing foam may be affixed to the panels 110, 120, 130 of the shelter 100 using various methods such as adhesives, hook and loop connectors, mechanical fasteners, etc. One or more layers of the sound absorbing foam may be used on the inner and outer surfaces of the shelter. According to an example embodiment, the outer surfaces of the shelter may include three layers of sound absorbing foam, while the inner surfaces of the shelter may include one layer of sound absorbing foam. With reference to the example sound absorbing foam shown in FIG. 2, two layers of foam may include arranging a flat side 220A of a first layer of foam 220 against a "toothed" side 220B of a second layer of foam. Alternatively, the toothed side 220B of the first layer may be arranged so that it faces the toothed side 220B of the second layer in such a way that the protruding portions 221 of one layer fit in the recessed portions 222 of the other layer. The sound absorbing foam may absorb the incoming sound to significantly reduce the volume of the sound. The sound absorbing material is extremely resistant to sound transmission. Once the sound wave is inside the foam the sound wave is deadened quickly and effectively. The insulating foam traps the noise and brings it to a halt before reaching the ears of the dog.

Figure 3A:
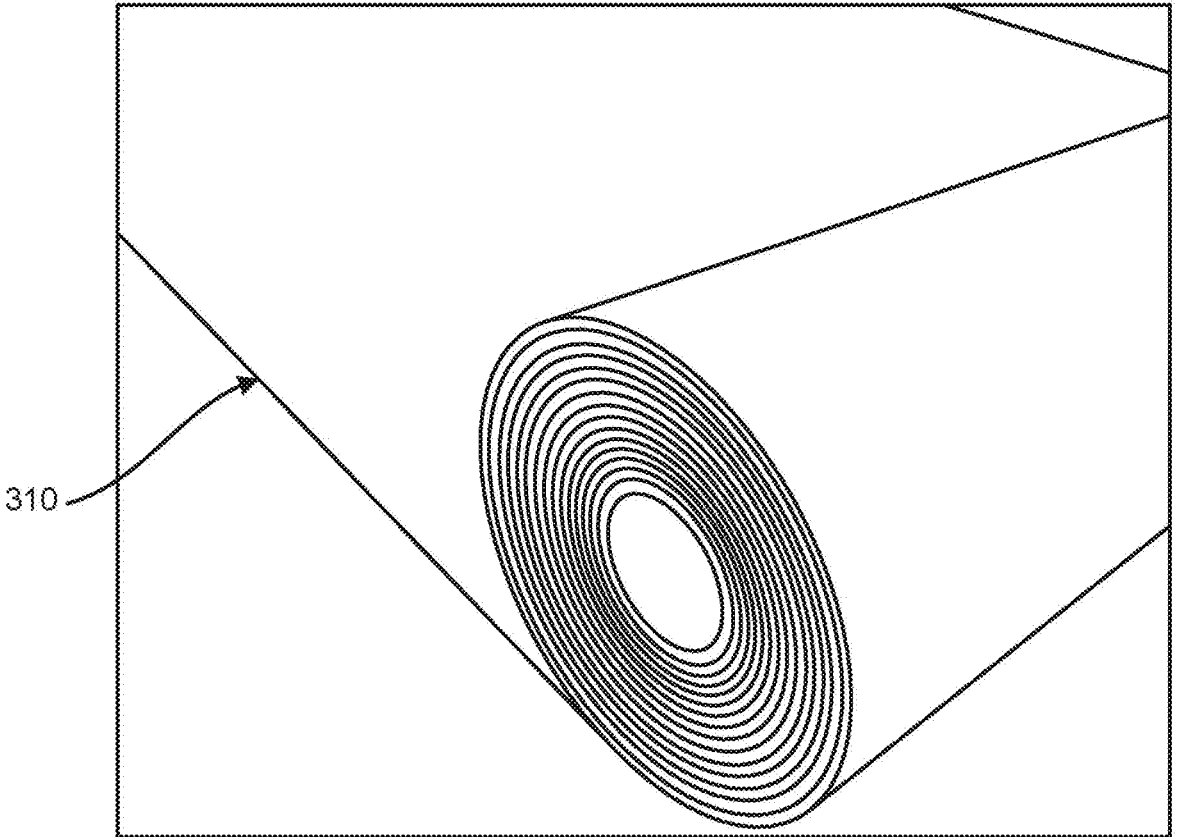
FIG. 3A shows sound blocking material according to an example embodiment.
Figure 3B:
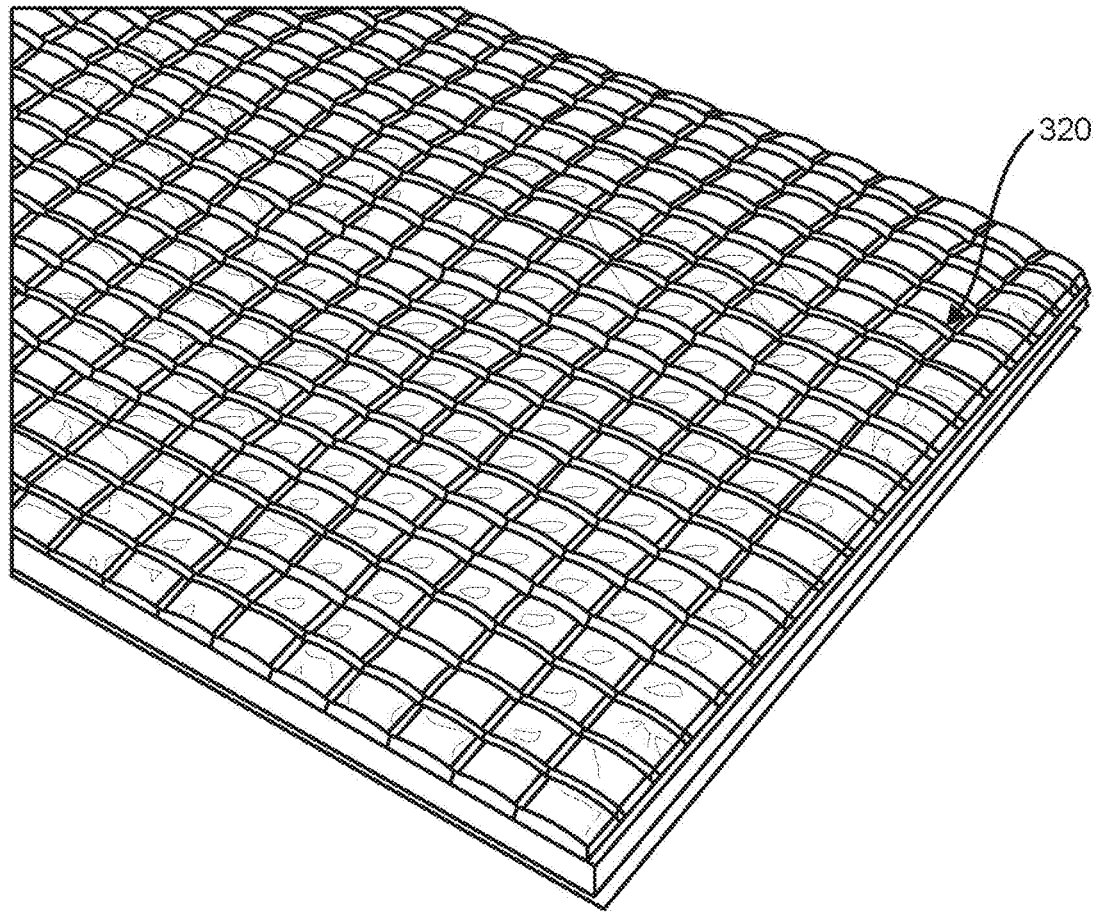
FIG. 3B shows sound deadening material according to an example embodiment.

In addition to the sound absorbing foam, layers of sound blocking material and sound deadening material may be used, example embodiments of which are respectively shown in FIGS. 3A & 3B. Referring to FIG. 3A, the sound blocking material may include mass loaded vinyl (MLV) material 310. The MLV material 310 is a reflective barrier that may contain and block sound waves as they make contact with the surface. ML V material 310 is a thin, but very dense, rubber-like material that is flexible and heavy. MLV material 310 may include two principal components: a natural high mass element (such as barium sulfate or calcium carbonate) and vinyl. The vinyl is what gives the MLV material 310 its flexibility while barium sulfate or calcium carbonate, which are highly dense compounds, is what gives the MLV material 310 its soundproofing capability. The MLV material 310 is both a potent sound barrier and effective sound absorber. This is unlike most other noise reduction materials, such as fiberglass or mineral fiber, that only do one but not the other. The MLV material 310 may also be durable to withstand damage from animals. For example, many dogs while in the shelter scratch their pillow and sides of the bed wall before settling down to sleep. The dog bed scratching habit in some cases can be very vigorous and may damage the sound absorbing foam, whereas the non-foam acoustic panels inside the shelter may be able to better withstand the digging/scratching habit than the foam.

Referring to FIG. 3B, sound deadening material 320 may be used to further dampen noise to prevent harm to an animal in the shelter. For example, the deadening material 320 may include Siless Vibro dampening material, which may include so-called "BmastiC" material. The sound deadening material 320 may include an adhesive on one side so that the sound deadening material 320 can be adhered to the sound blocking material 310 and/or the sound absorbing foam 210/220. The Siless Vibro dampening material may be oil- and water-proof closed cell polyethylene foam with an adhesive layer. "BmastiC" technology adds composites that reduce the mass of the material. The Siless Vibro dampening material may reduce vibration and form a thick barrier to absorb noises, thereby deadening the sound.

Figure 4:
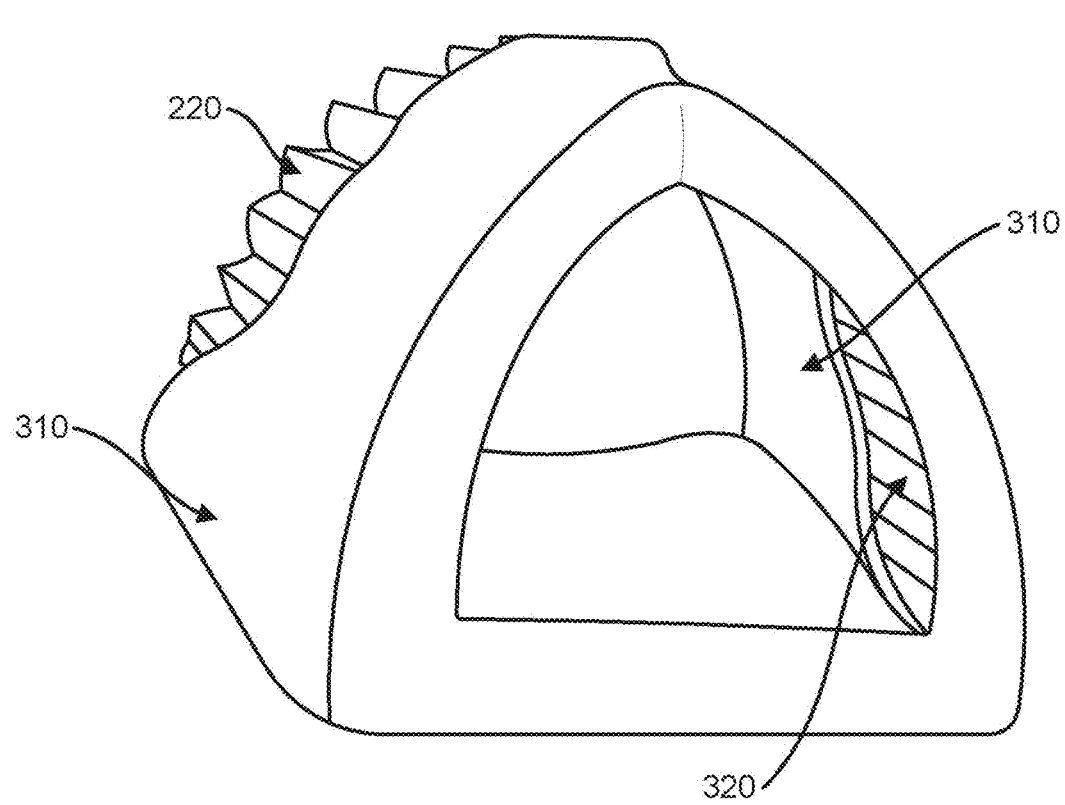
FIG. 4 shows an animal shelter including sound absorbing foam, sound blocking material, and sound deadening material according to an example embodiment.

As shown in FIG. 4, the one or more side panels 110, back panel 120, and front panel 130 may be covered with one or more layers of the sound blocking material 310, sound deadening material 320, and the sound absorbing foam 210/220. For example, as shown in FIG. 4, the sound absorbing foam 220 may be affixed to the outside surface of the one or more side panels 110, the back panel 120, and the front panel 130. The sound blocking material 310 may disposed on an outer surface of the sound absorbing foam. Referring to the inside of the shelter 100, the sound deadening material 320 may be affixed to the inner surface of the one or more side panels 110, the back panel 120, and the front panel 130. A second layer of the sound blocking material 310 may be affixed to an inner surface of the sound deadening material 320. By using the sound blocking material 310 as the inner most layer exposed to the animal inside the shelter 100, the sound blocking material 310 may provide increased durability and be better able to withstand damage from the animal. According to one or more example embodiments, the side panels 110, back panel 120, and front panel 130 may be made up of the layered combination of the sound blocking material 310, the sound absorbing foam 220, the sound deadening material 320, and a second layer of the sound blocking material 310, without a separate layer that comprises the side panels 110, back panel 120, and front panel 130. According to various example embodiments, the order of the layering of the sound blocking material 310, the sound absorbing foam 220, and the sound deadening material 320 may be changed without departing from the scope of the disclosure.

Figure 5:
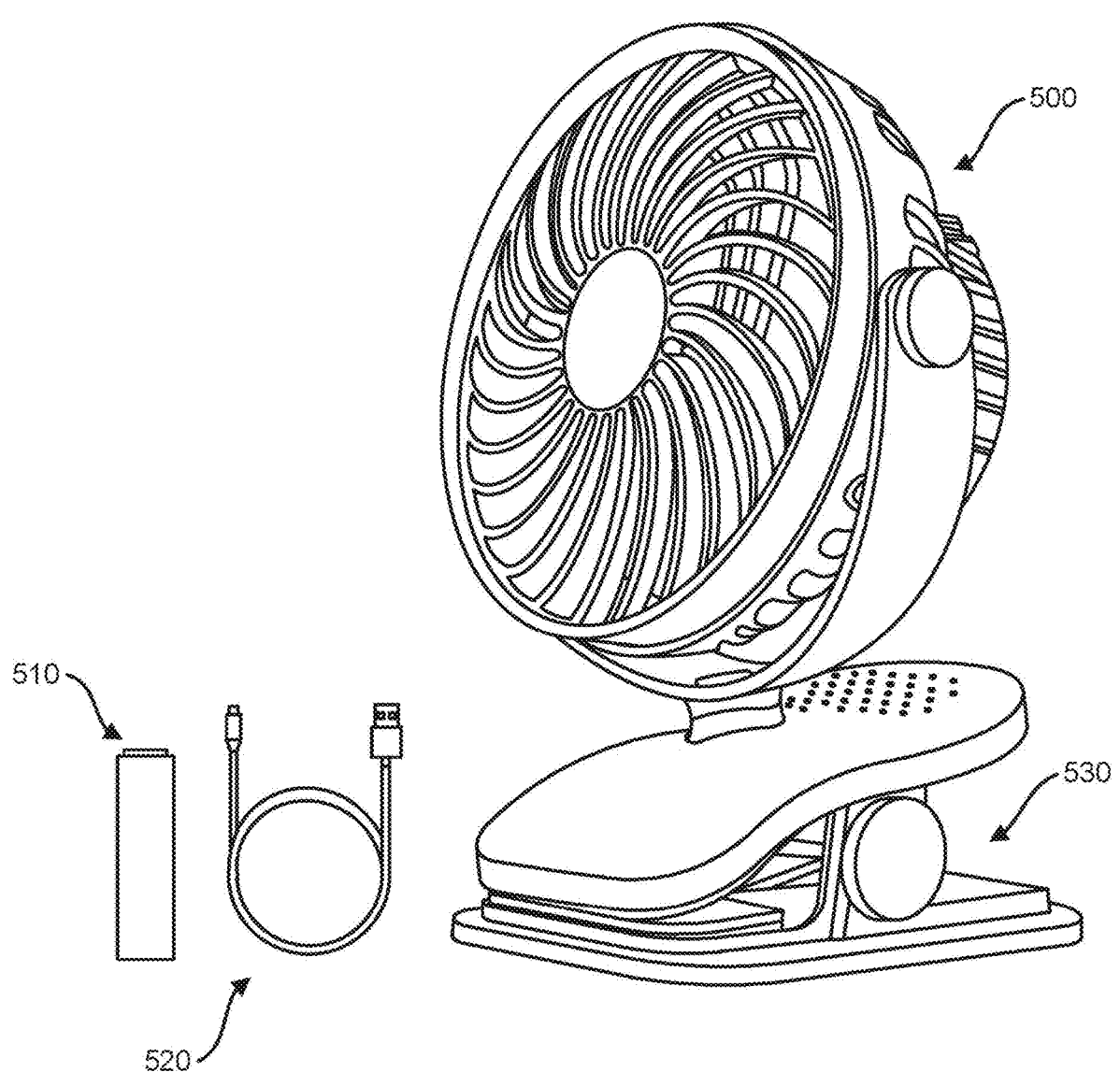
FIG. 5 shows a fan that may be used in connection with the animal shelter according to an example embodiment.
Figure 6:
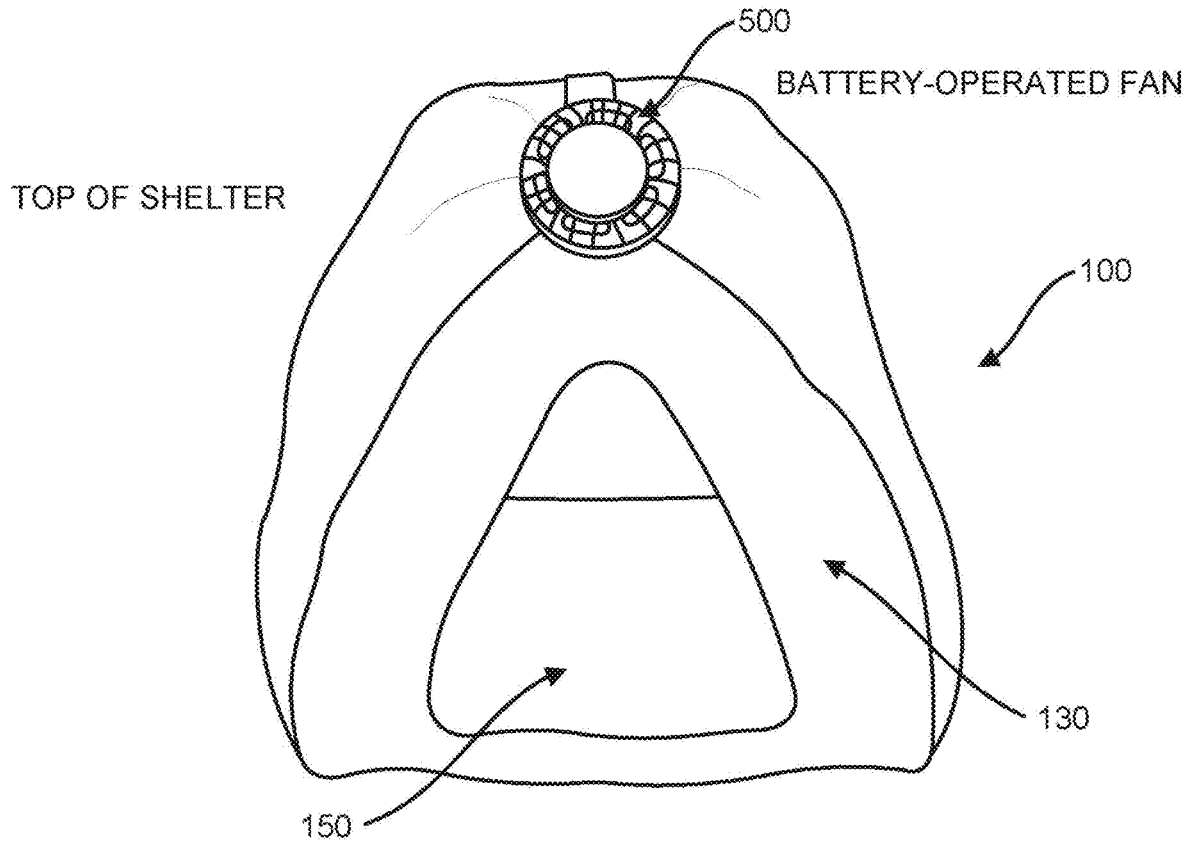
FIG. 6 shows an animal shelter according to an example embodiment having a fan directed toward the interior of the animal shelter.

FIG. 5 shows a fan 500 that may be used in accordance with an example embodiment. The fan may be powered by a battery 510, which may be re-charged via a charging cable 520. The fan 500 may include a clip 530 or other fastening mechanism so that the fan 500 can be affixed to the shelter 100. As shown in the example embodiment of FIG. 6, the fan 500 may be mounted near the top of the shelter 100 and directed inward so that the fan 500 circulates air within the shelter 100. According to one or more example embodiments, the fan 500 may be mounted outside the shelter 100 with air directed through a mesh door, roof panel, side panel, etc. directly into the shelter. The air blown by the fan 500 may raise the pressure within the shelter into the normal range 29.7 to 30.9 inHg. By raising the pressure in the shelter 100, the fan 500 may reduce discomfort felt by the dog due to reduced barometric pressure, as well as reduce the temperature in the shelter. Referring to FIG. 6, the shelter 100 may include an opening in the top of the shelter that may be covered by a removable flap or cover. The fan blade housing may be inserted through the opening so that the fan 500 will blow air into the shelter, and the base of the fan 500 may clip or otherwise be affixed to the edge of the opening so that the fan 500 is secured to the shelter. According to an example embodiment, the fan 500 may be also be clipped to a mesh door covering the opening 140 in the front panel 130, so that the fan may blow air directly into shelter. Other fan placements may be possible to accomplish raising the barometric pressure in the shelter 100.

Figure 7A:
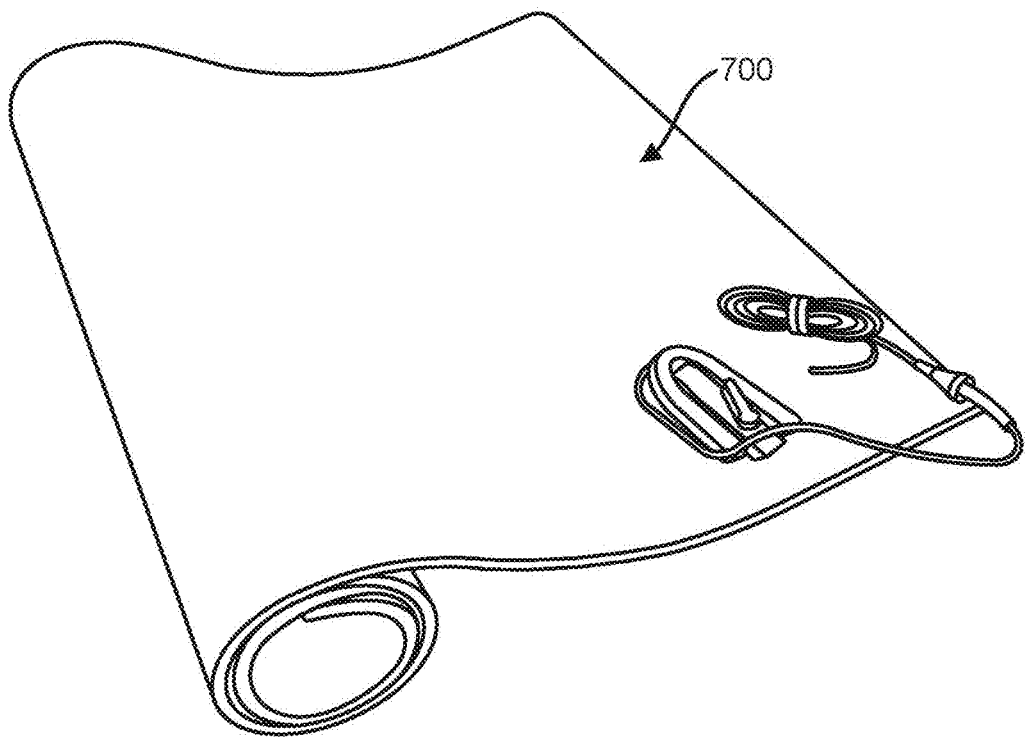
FIG. 7A shows a grounding mat according to an example embodiment.
Figure 7B:
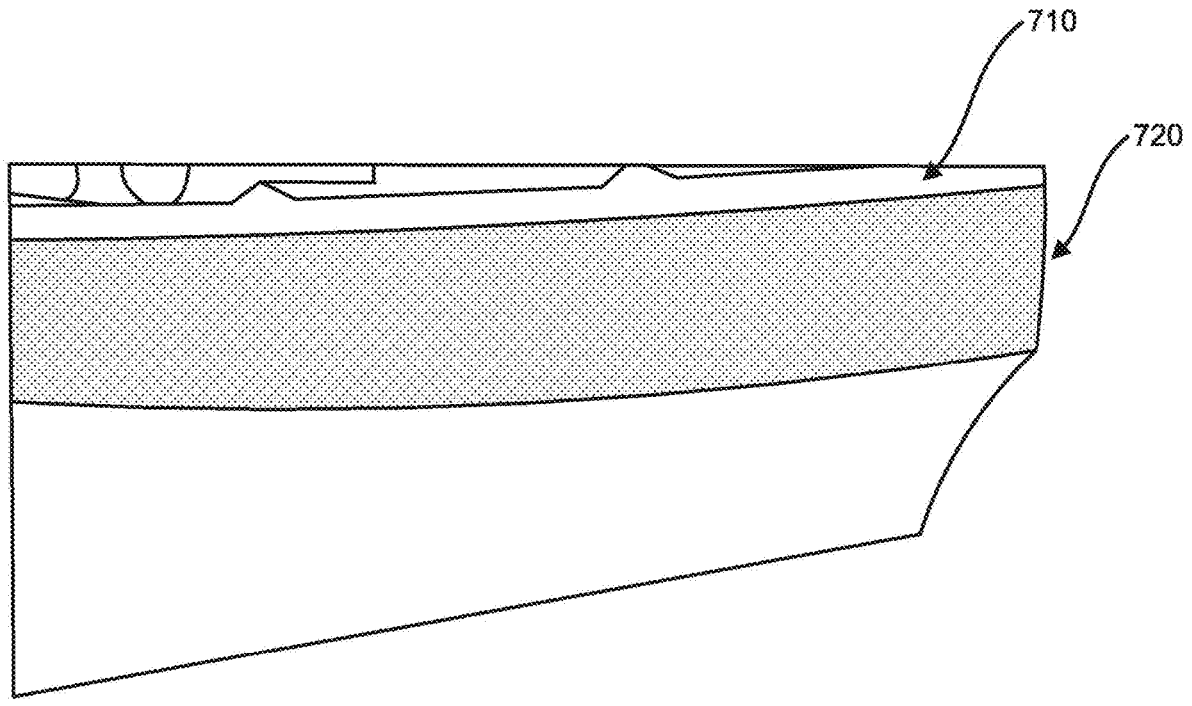
FIG. 7B shows a cross-sectional view of a ground mat according to an example embodiment.
Figure 8:
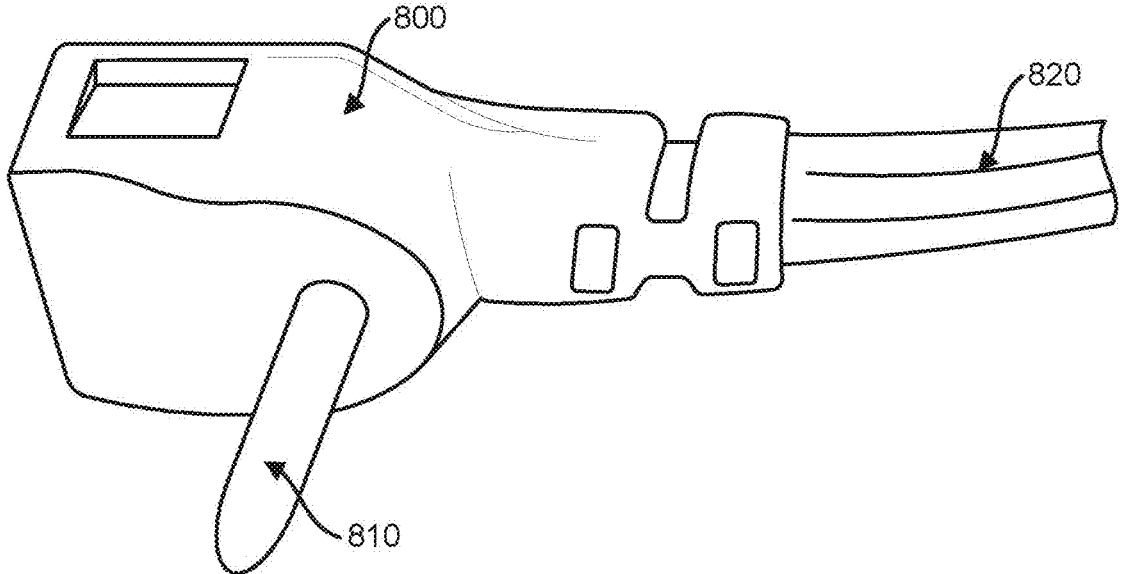
FIG. 8 shows a plug configured to be coupled to the grounding mat according to an example embodiment.
Figure 9:
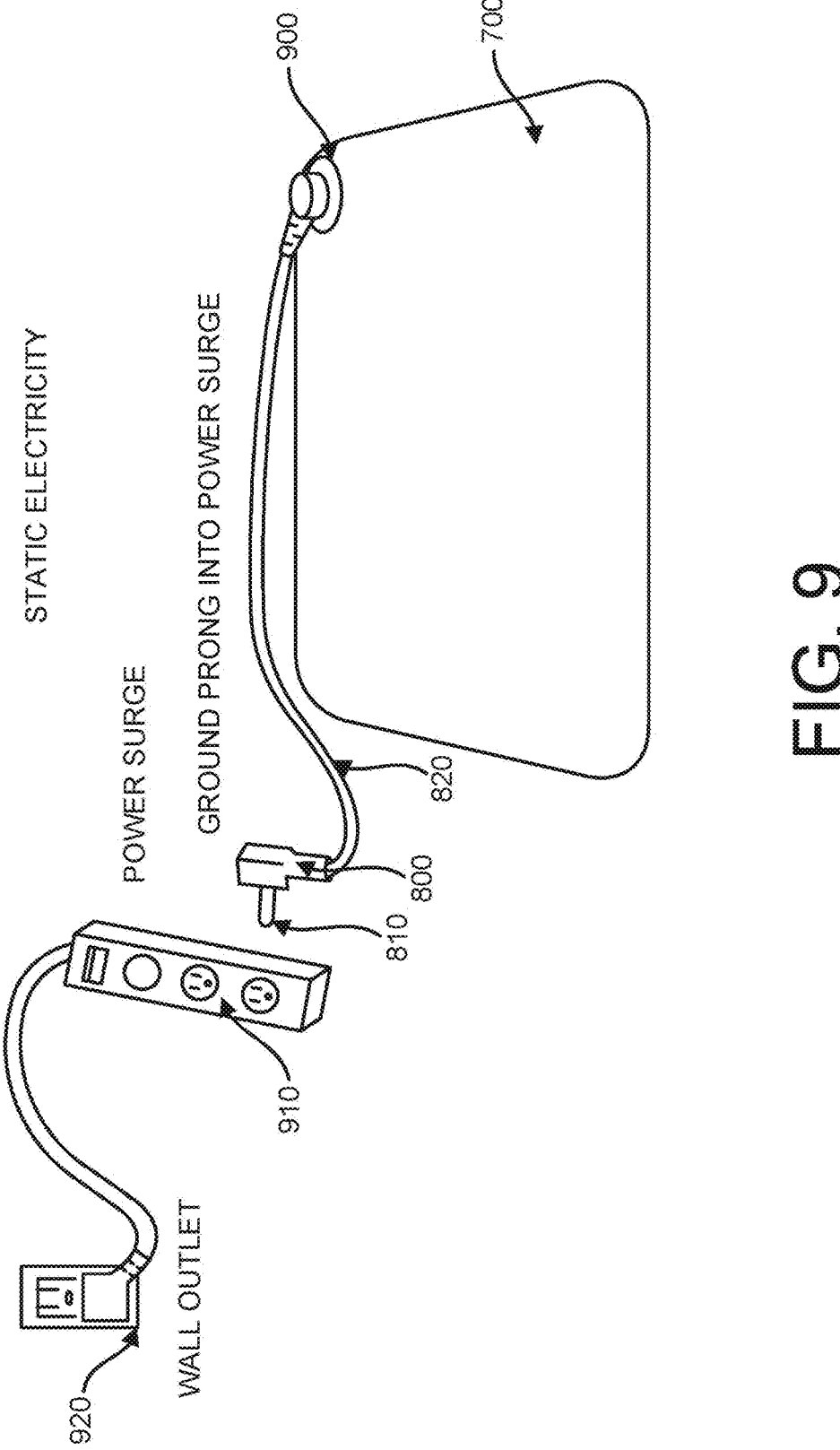
FIG. 9 shows a grounding mat coupled to a surge protector according to an example embodiment.
Figure 10:
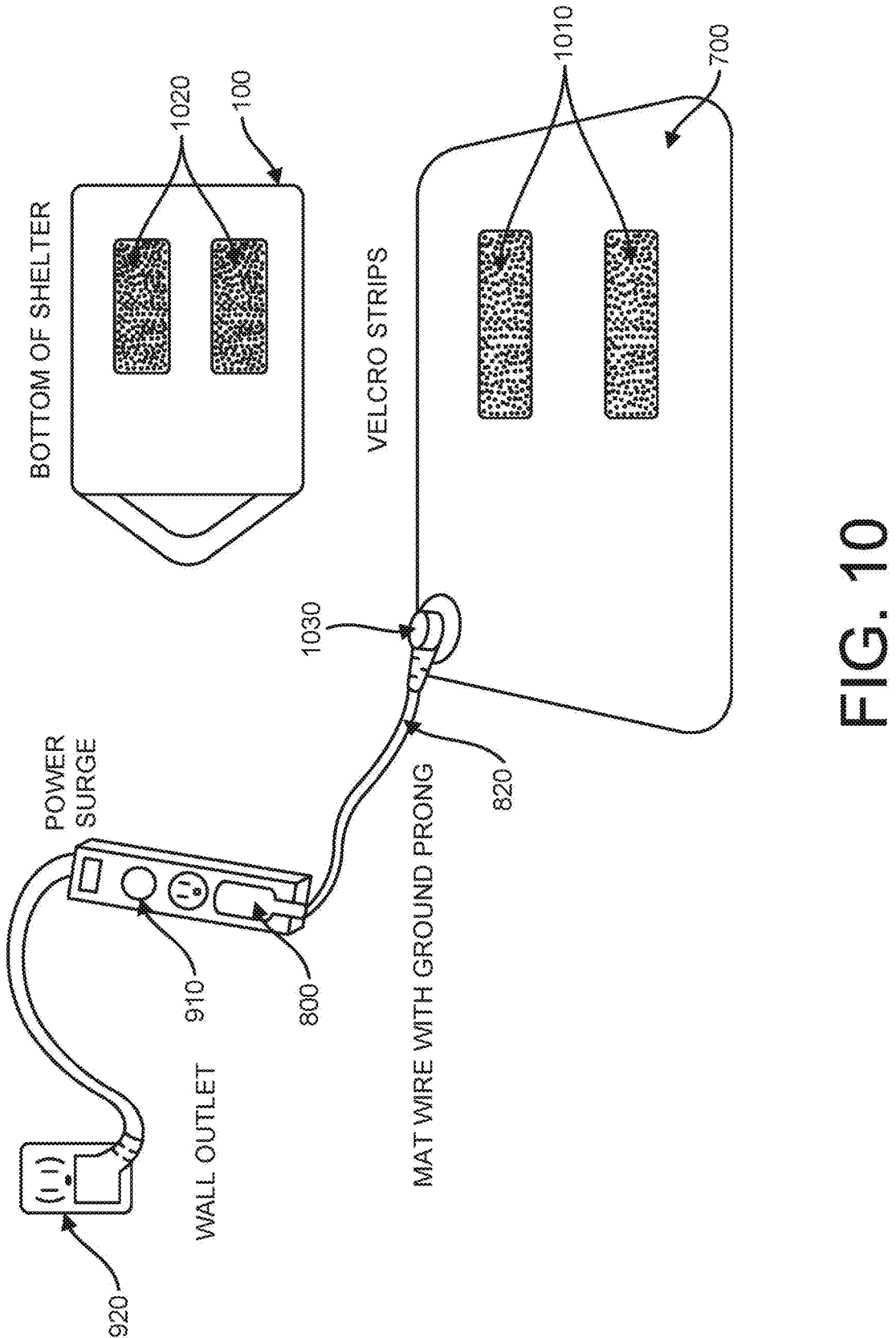
FIG. 10 shows a grounding mat and bottom of an animal shelter according to an example embodiment.

FIG. 7A shows a grounding mat 700 according to an example embodiment. As explained above, dogs are susceptible to static electricity through their fur, which can cause an unpleasant tingling sensation. The grounding mat 700 may be coupled to the bottom of the shelter 100 to dissipate static charge to avoid discomfort caused by static electricity. FIG. 7B shows a cross-sectional view of a grounding mat according to an example embodiment. Referring to FIG. 7B, the grounding mat 700 include a top layer 710 that may be a dissipative rubber layer, and a bottom layer 720, which may be a carbon-loaded conductive scrim layer. Referring to FIGS. 7A-9, the grounding mat 700 is configured to conduct static electricity from the shelter 100 through an electrically-conductive ground conductor 900, to an electrically-conductive ground wire 820, and then to a ground only plug 800 connected to a power surge protector, and then to a grounded electrical outlet. As shown in FIGS. 8-9, the grounding mat 700 may include a plug 800 with only a ground prong 810 that is plugged into a power surge protector 910, which is plugged into a standard wall outlet 920, to drain off the static electricity in the air. The ground prong 810 grounds the shelter 100. The result is that when a dog or similar furry pet is inside the shelter, static electricity affecting the animal is drained to electrical ground in a safe manner. If by chance lightning hits the house, the power surge protector 910 protects the shelter 100 and the dog/animal just as it protects your computer and TV during a storm. As shown in FIG. 10, the grounding mat 700 may include one or more hook and loop strips 1010 configured to engage with one or more hook and loop strips 1020 located on the bottom of the shelter 100 to maintain the connection between the grounding mat 700 and the shelter 100. Although hook and loop connectors are used in this example embodiment, other types of coupling mechanisms may be used to maintain the connection between the grounding mat 700 and the shelter 100.

The grounding mat 700 may include a snap 1030 that is configured to couple the plug 800 having the ground prong 810 to the grounding mat 700. The snap 1030 may be attached through the top layer of the grounding mat 700 to make contact with the bottom conductive layer of the grounding mat 700 so that it can be connected to an electrical outlet using the ground prong 810. The snap 1030 may be, but is not necessarily, located at a corner of the grounding mat 700, and may conduct static charge directly from the grounding mat 700 to the electrical outlet 920 using the ground wire 820. The conductivity of the snap 1030 will create a dedicated path for static charge to travel off the grounding mat 700 into the ground wire 820.

Figure 11:
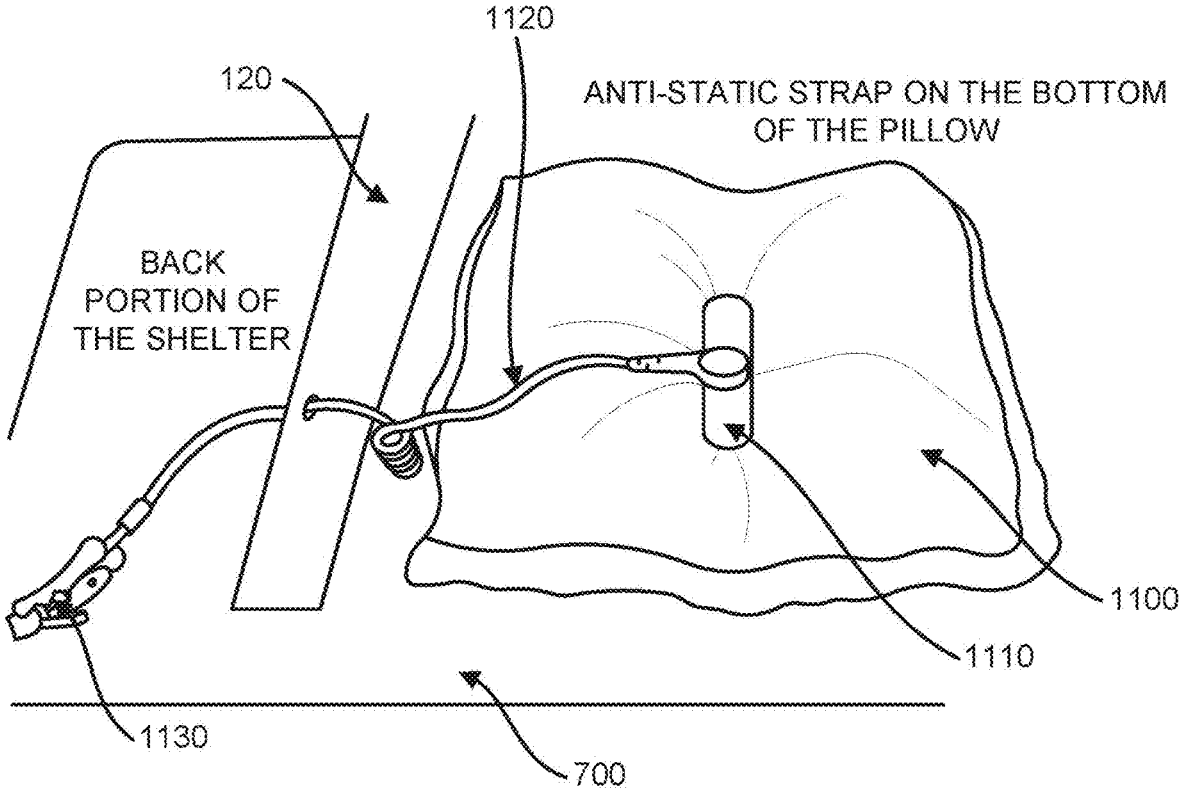
FIG. 11 shows a grounding pillow that may be used in the animal shelter according to an example embodiment.
Figure 12:
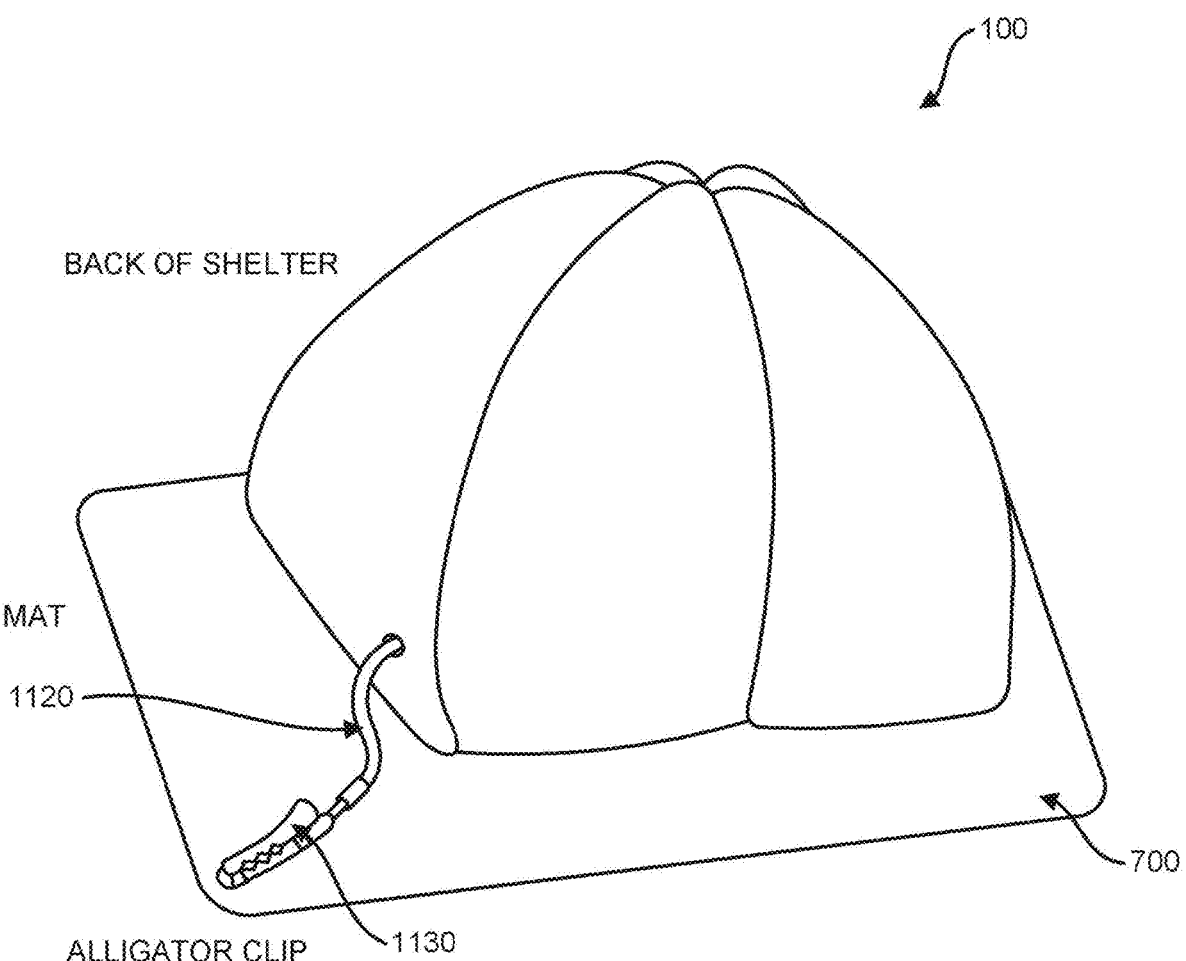
FIG. 12 shows a coupling of a grounding pillow to the grounding mat according to an example embodiment.

FIG. 11 shows a grounded pillow 1100 that may be included within the shelter 100 according to an example embodiment. The grounded pillow 1100 may include an anti-static strap 1110 that is coupled to the bottom of the pillow 1100, as shown in FIG. 11. The anti-static strap 1100 may be hypoallergenic silver suffused nylon threading. It may be made of flexible durable material, consisting of an elastic band of fabric with fine conductive fibers woven into it, attached to an electrically conductive wire 1120 with a clip 1130 on the end to connect it to a ground conductor 900. The fibers may be made of carbon or carbon-filled rubber, and the strap may be bound with a stainless-steel clasp or plate, which may snap on the strap where the socket snap of the coiled wire is located. The strap 1120 may be wrapped around the material in the bottom portion of the pillow 1100 and snapped in place.

The anti-static strap 1110 may be coupled to the electrically-conductive wire 1120 that may pass through a hole in the side, front, or rear panel of the shelter 100. The end of the wire that passes through the shelter panel to the outside of the shelter 100, may include an alligator clip 1130 or other coupling mechanism that can couple the grounding pillow 1100 to the grounding mat 700. By coupling the grounding pillow 1100 to the grounding mat 700 that includes a ground prong 810 plugged into a surge protector 910, the grounding pillow 1100 is able to further dissipate static charge. The static pillow 1100 may be made of an anti-static fabric to further reduce the amount of static charge that may cause discomfort to the dog. The anti-static fiber may also be used to line the interior and/or exterior of the shelter 100. For example, the anti-static fiber material may be sewn to the sound absorbing foam 220, the sound blocking material 310 and/or the sound deadening material 320 like a slipcover. The anti-static fiber material may then be sewn or otherwise affixed to the interior or exterior surface of the shelter 100.

Figure 13:
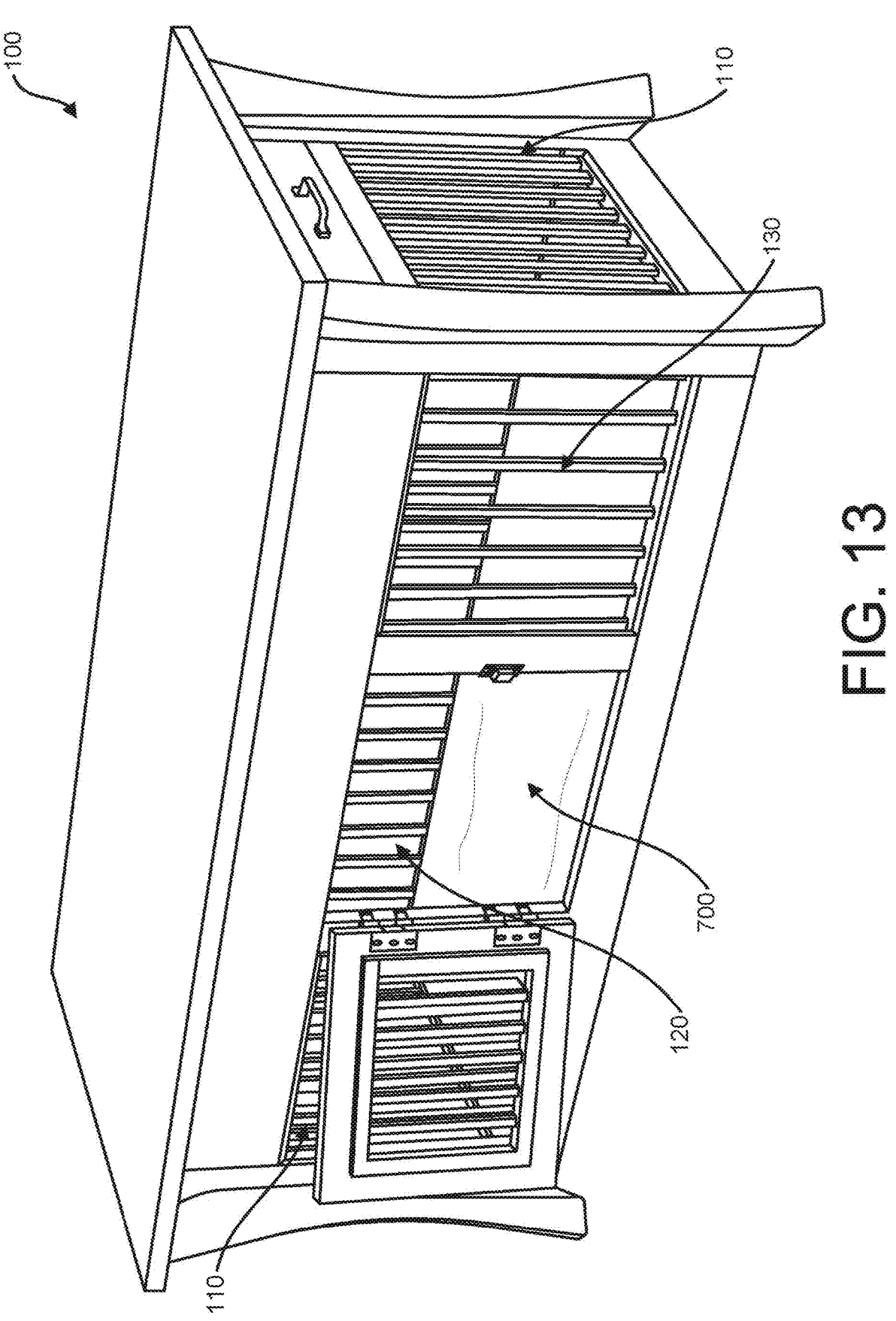
FIG. 13 shows an animal shelter according to an example embodiment.
Figure 14:
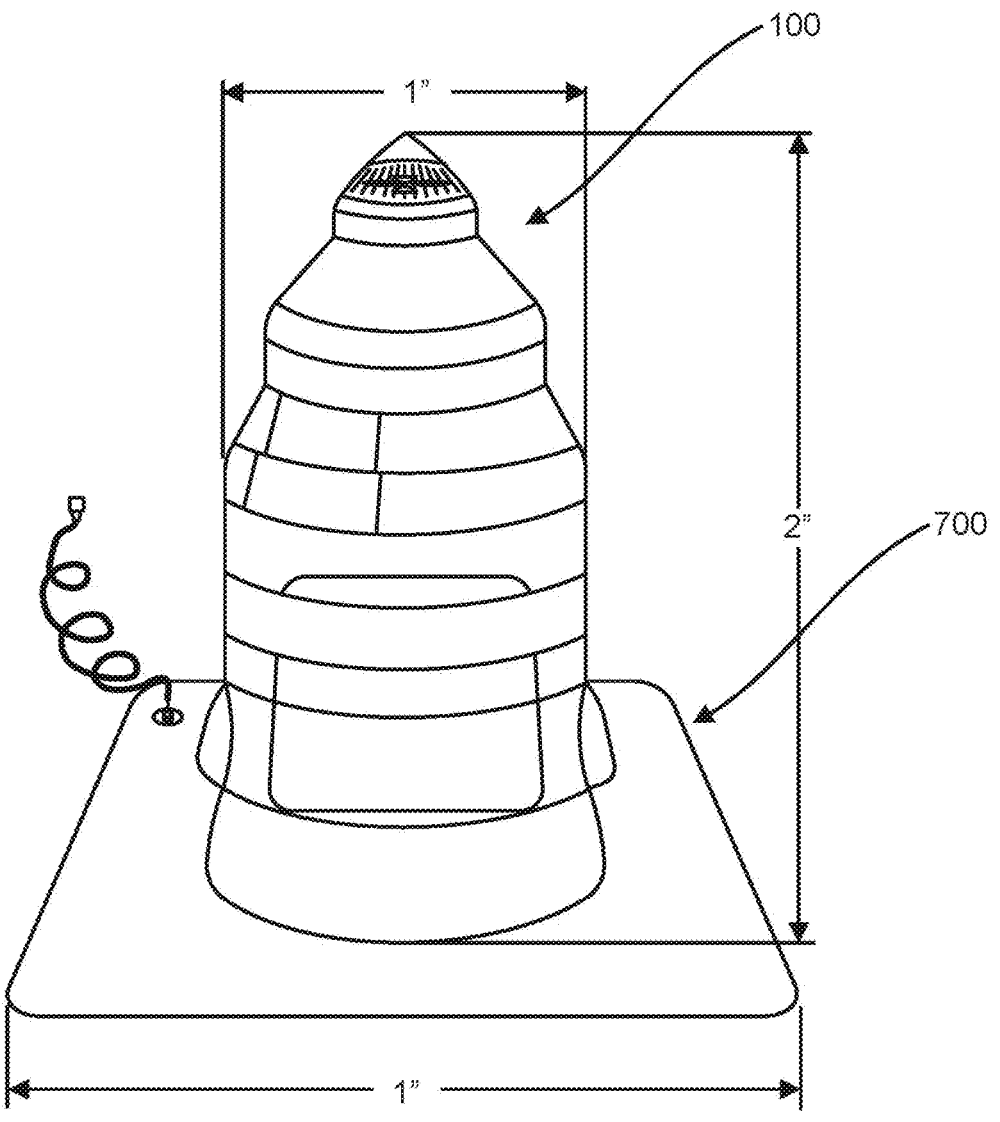
FIG. 14 shows an animal shelter according to another example embodiment.

As described above, the shelter 100 may take any shape and may be of any size. For example, the shelter 100 may be in the form of furniture, such as a coffee table, end table, or the like, as shown in the example embodiment of FIG. 13. Referring to FIG. 13, the shelter 100 of the illustrated example embodiment includes two side panels 110, a back panel 120, a front panel 130, and a grounding mat 700 on the bottom of the shelter 100. The side panels 110, back panel 120, and front panel 130 may be lined on the interior and/or exterior sides with one or more layers of the sound blocking material 310, sound deadening material 320, and the sound absorbing foam 210/220, as shown in FIG. 4, though not shown in FIG. 13. Likewise, as shown in the example embodiment of FIG. 14, the shelter 100 may be in the shape of a rocket ship, or other shape, and may be coupled to the grounding mat 700, as explained above. As described above, sound absorbing foam 220, sound blocking material 310, and sound deadening material 320 may be used to create a liner for the interior space within the coffee table to reduce the volume of sound experienced by an animal therein, without negatively impacting the aesthetics or functionality of the exterior of the coffee table.

Figure 15:
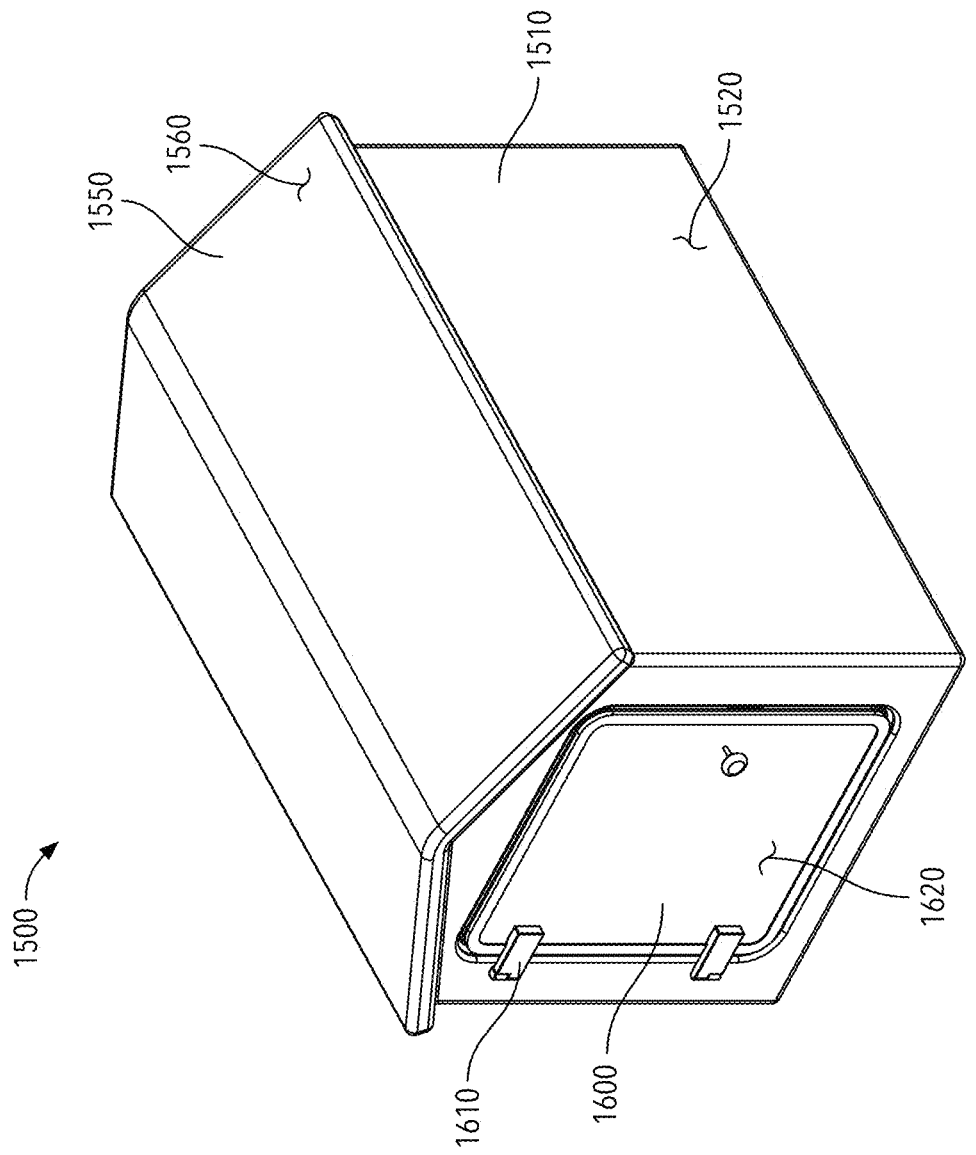
FIG. 15 shows a perspective view of an animal shelter according to another example embodiment with a door closed.

FIG. 15 is a perspective view of an animal shelter according to another example embodiment with a door closed. In the example embodiment, animal shelter 1500 has four (4) side panels 1510, two (2) top panels 1550, and bottom panel 1590. Further, door 1600 is hingedly connected to one of side panels 1510 utilizing one (1) or more door hinges 1610. Door 1600 is operatively arranged to allow an animal to enter or exit animal shelter 1500.

Figure 16:
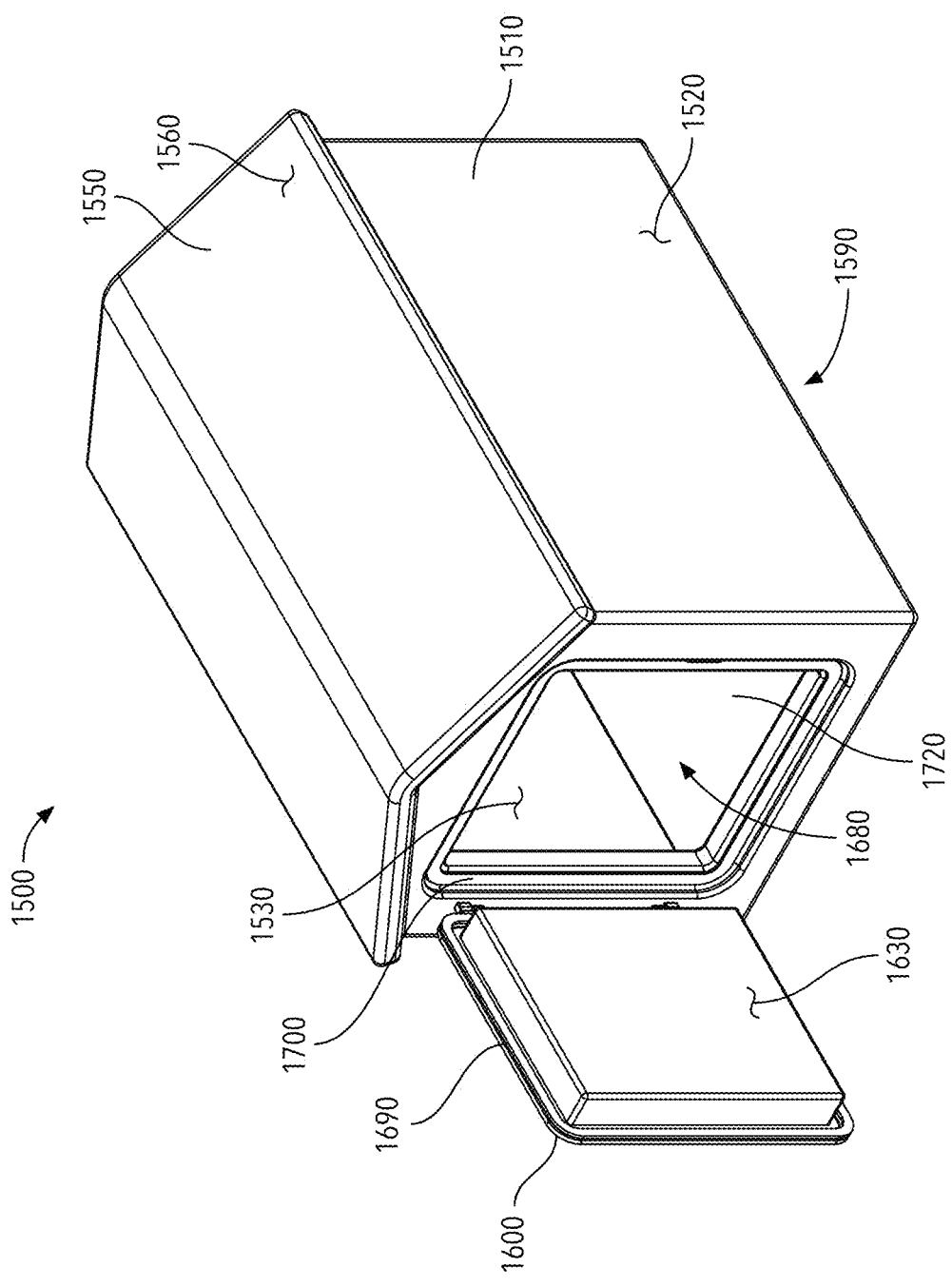
FIG. 16 shows a perspective view of the animal shelter as shown in FIG. 15 with the door open.

FIG. 16 is a perspective view of the animal shelter as shown in FIG. 15 with door 1600 open. Side panels 1510, top panels 1550, and bottom panel 1590 create substantially enclosed area 1650. When door 1600 is in an open position, an animal has access to substantially enclosed area 1650.

Figure 17:
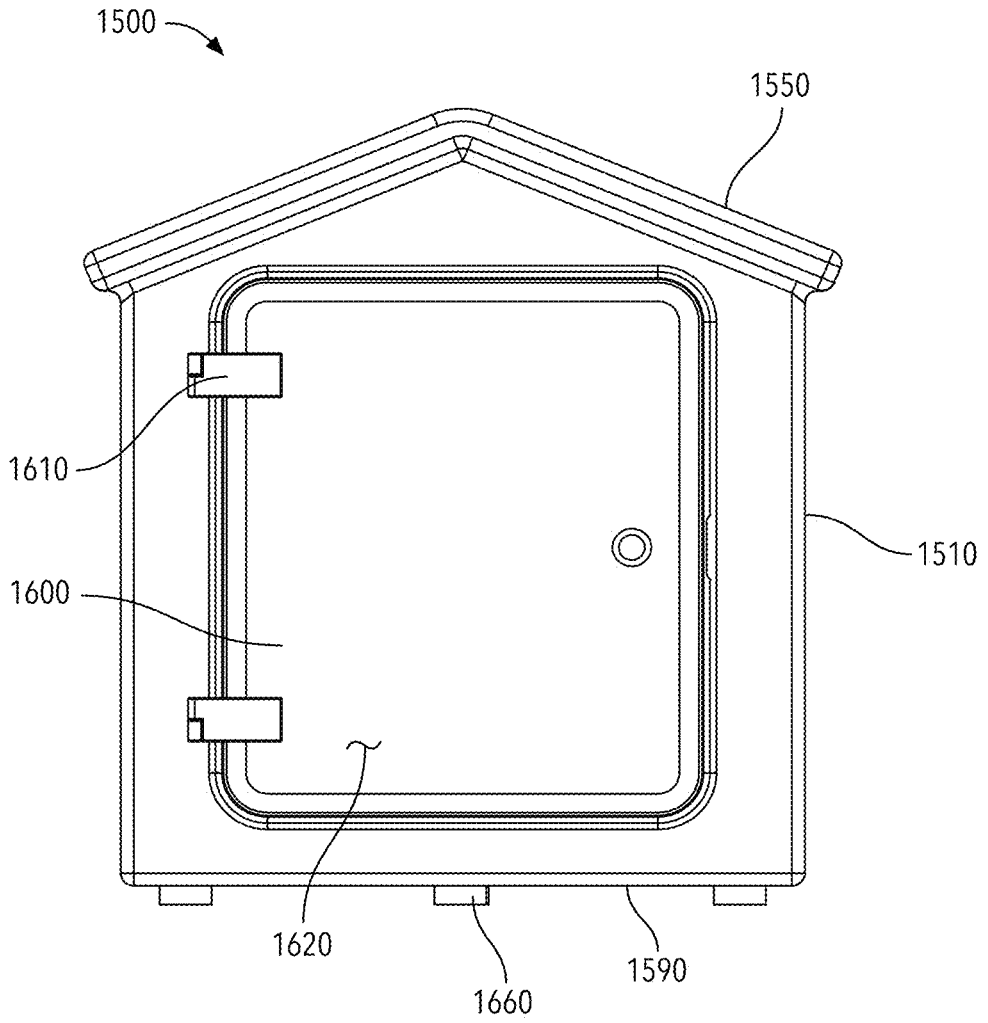
FIG. 17 shows a front view of the animal shelter as shown in FIG. 15.

FIG. 17 is a front view of the animal shelter as shown in FIG. 15. Animal shelter 1500 has one or more vibration damping feet 1660 coupled to bottom panel 1590. It should be appreciated that vibration damping feet 1660 may be made of material which can quickly absorb vibration energy, including, but not limited to rubber, polyurethane, or polyvinyl chloride. Vibration damping feet 1660 are operatively arranged to minimize vibrations from external sources, enhancing comfort for the animal.

Figure 18:
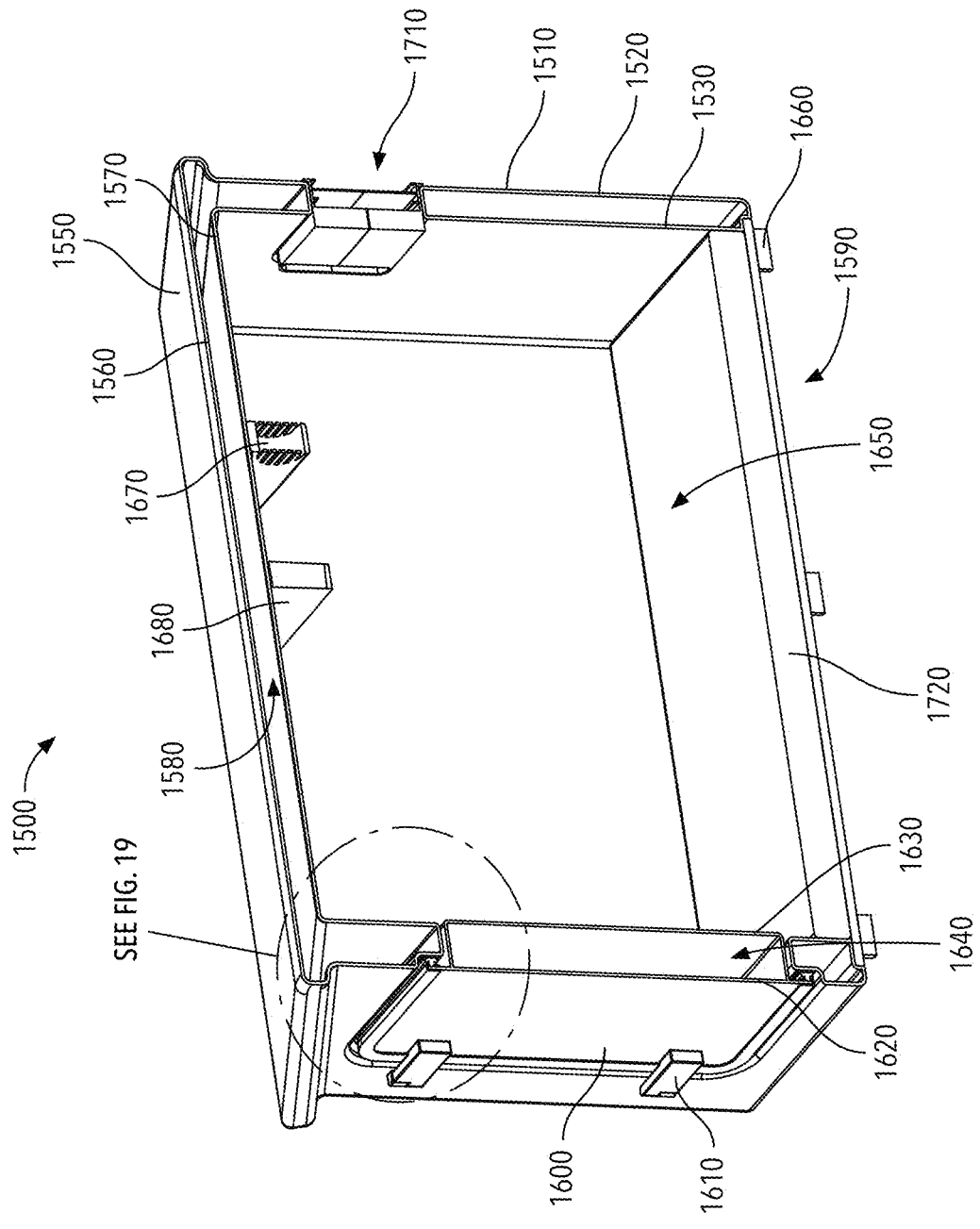
FIG. 18 shows a partial cutaway view along the length of the animal shelter as shown in FIG. 15.

FIG. 18 is a partial cutaway view along the length of the animal shelter as shown in FIG. 15. In the example embodiment, animal shelter 1500 has side panels 1510. Side panels 1510 having outer wall 1520 and inner wall 1530. Side panel air pocket 1540 is thereby formed between side panel outer wall 1520 and inner wall 1530. Animal shelter 1500 further has top panels 1550 having top panel outer wall 1560 and top panel inner wall 1560. Similarly to side panels 1510, top panels 1550 have air pocket 1580 between top panel outer wall 1560 and top panel inner wall 1570. Top panels 1550 are coupled to side panels 1510. Bottom panel 1590 is also coupled to side panels 1510 opposite top panels 1550, creating substantially enclosed area 1650. Door 1600 is hingedly connected to side one of side panels 1510 through the use of one or more hinges 1610. Door 1600 further has outer wall 1620 and inner wall 1630. Door air pocket 1640 is formed between door outer wall 1620 and inner wall 1630. Further, animal shelter 1500 has one or more vibration damping feet 1660 coupled to bottom panel 1590. In the example embodiment, grounding mat 1720 is coupled to bottom panel 1590 within substantially enclosed area 1650. Grounding mat 1720 is configured to dissipate static charge in the same matter as shown in FIGS. 7A-9 and described above. In the example embodiment, animal shelter 1500 further comprises fan 1670 and speaker 1680 coupled to animal shelter 1500. It should be appreciated that fan 1670 and speaker 1680 may be powered by rechargeable batteries. Fan 1670 is configured to circulate air within substantially enclosed area 1650 and is also configured to introduce sound into substantially enclosed area 1650. Similarly to fan 1670, speaker 1680 is configured to introduce sound into substantially enclosed area 1650. Further, speaker 1650 may be arranged to receive audio signals transmitted wireless. Animal shelter 1500 further comprises baffle 1710 within one of side panels 1510. Baffle 1710 is operatively arranged to allow air flow in or out of animal shelter 1500, detailed infra.

Figure 19:
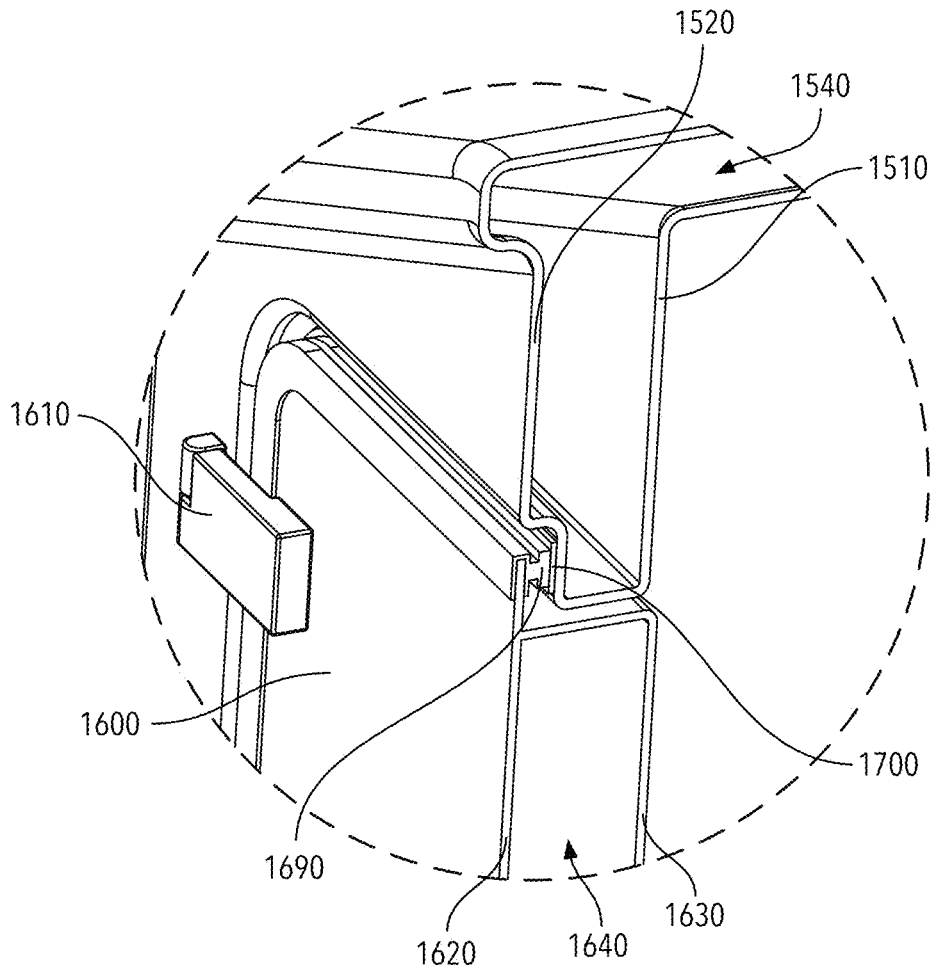
FIG. 19 shows a detailed view of the animal shelter as shown in FIG. 15 taken generally at detail FIG. 19 as shown in FIG. 18.

FIG. 19 is a detailed view of the animal shelter as shown in FIG. 15 taken generally at detail FIG. 19 as shown in FIG. 18. Door 1600 comprises flexible gasket 1690 having an embedded magnetic strip therein (not shown). Further, one of side panel 1510 comprises ferromagnetic strip 1700. When door 1600 is in a closed position, flexible gasket 1600 is magnetically releasably coupled to ferromagnetic strip 1700, creating a seal between door 1600 and side panel 1510.

Figure 20:
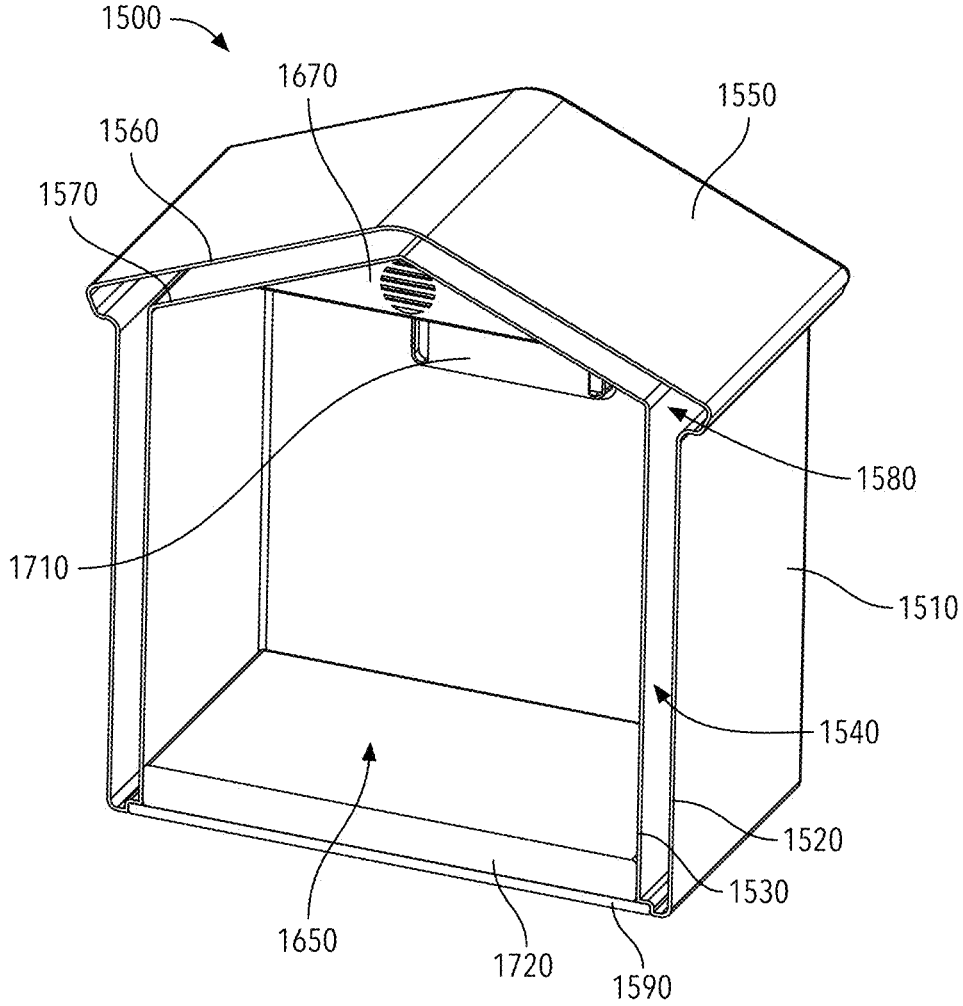
FIG. 20 shows a partial cutaway view along the width of the animal shelter as shown in FIG. 15; and, FIG. 21 shows a baffle that may be used in the animal shelter according to an example embodiment.

FIG. 20 is a partial cutaway view along the width of the animal shelter as shown in FIG. 15. Animal shelter 1500 has side panels 1510 having outer wall 1520, inner wall 1530, and air pocket 1540. Animal shelter 1500 further has top panels 1550 having top panel outer wall 1560, top panel inner wall 1560, and air pocket 1580 between top panel outer wall 1560 and top panel inner wall 1570. Top panels 1550 are coupled to side panels 1510. Bottom panel 1590 is also coupled to side panels 1510 opposite top panels 1550, creating substantially enclosed area 1650. In the example embodiment, animal shelter 1500 further comprises fan 1670 coupled to animal shelter 1500. Fan 1670 is configured to circulate air within substantially enclosed area 1650 and is also configured to introduce sound into substantially enclosed area 1650. Animal shelter 1500 further comprises baffle 1710 within one of side panels 1510. Baffle 1710 is operatively arranged to allow air flow in or out of animal shelter 1500, detailed infra.

Figure 21:
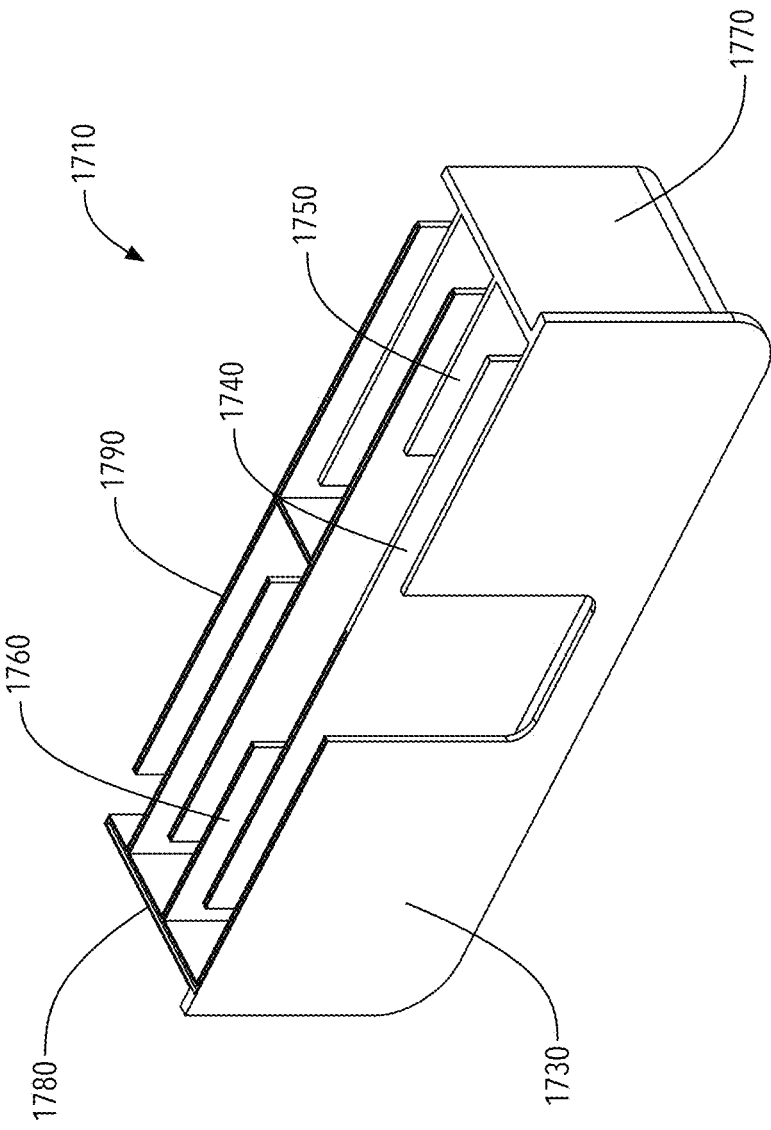

FIG. 21 is a baffle that may be used in the animal shelter according to an example embodiment. Baffle 1710 is operatively arranged to allow airflow while maintaining sound absorption properties. Baffle 1710 comprises first baffle outer wall 1730, second baffle outer wall 1790, first baffle side wall 1770, second baffle side wall 1780, first baffle inner wall 1740, second baffle inner wall 1750, and third baffle inner wall 1760. The space between first baffle inner wall 1740, second baffle inner wall 1750, and third baffle inner wall 1760 may be filled with porous sound absorbing foam allowing the passage of air through baffle 1710. The sequence of first baffle inner wall 1740, second baffle inner wall 1750, and third baffle inner wall 1760 may be repeated as needed for the proper sizing of baffle 1710 to fit within one of side panels 1510.

Although the inventive concepts of the present disclosure have been described and illustrated with respect to example embodiments thereof, it is not limited to the example embodiments disclosed herein and modifications may be made therein without departing from the scope of the inventive concepts.

What is claimed is:

1. An animal shelter comprising:

one or more side panels, each side panel has an outer wall and an inner wall, wherein an air pocket is formed between said outer wall and said inner wall, the air pocket being a hollow continuous space between the outer and inner walls of the one or more side panels;

a door hingedly connected to one of said one or more side panels, said door configured to allow an animal to enter and exit said animal shelter;

a sound absorbing baffle located within one of said one or more side panels, said baffle operatively arranged to allow air to flow in or out of said animal shelter;

one or more top panels coupled to said one or more side panels, said top panels having an outer wall and an inner wall, wherein an air pocket is formed between said outer wall and said inner wall, the air pocket of the one or more top panels being a hollow continuous space between the outer and inner walls of the one or more top panels;

a bottom panel coupled to said one or more side panels, wherein said one or more side panels, said one or more top panels, and said bottom panel create a substantially enclosed area;

wherein the air pockets formed by the outer and inner walls of both the one or more side panels and the one or more top panels form a continuous single air pocket within the one or more side panels and the one or more top panels;

one or more vibration damping feet coupled to said bottom panel;

a fan coupled to said animal shelter, said fan configured to circulate air within said substantially enclosed area, said fan further configured to introduce sound into said substantially enclosed area;

a speaker coupled to said animal shelter, said speaker configured to introduce sound into said substantially enclosed area;

a grounding mat arranged on said bottom panel of said shelter, said grounding mat configured to dissipate static charge via a conductor connected to ground; and, a surge protector electrically connected to said ground and to said grounding mat, said surge protector operatively arranged to protect said grounding mat and an animal in contact therewith from a lightning strike upon a house in which said animal shelter is located.

2. The animal shelter of claim 1, wherein said door comprises an outer wall and an inner wall, wherein an air pocket is formed between said outer wall and said inner wall.

3. The animal shelter of claim 1, wherein said door further comprises a flexible gasket having an embedded magnetic strip therein.

4. The animal shelter of claim 3, wherein said one or more side panels comprises a ferromagnetic strip, wherein when said door is in a closed position, said flexible gasket having an embedded magnetic strip is magnetically releasably coupled to said ferromagnetic strip.

5. The animal shelter of claim 1, wherein said speaker is configured to receive audio signals transmitted wirelessly.

6. An animal shelter comprising:

one or more side panels, each side panel has a first air pocket therein;

one or more top panels coupled to said one or more side panels, each top panel has a second air pocket therein, wherein:

the first and second air pockets comprise a hollow void between respective outer and inner walls which form the one or more side panels and the one or more top panels: and, the first and second air pockets collectively form a continuous single air pocket within the one or more side panels and the one or more top panels;

a door connected to one of said one or more side panels;

a bottom panel coupled to said one or more side panels, wherein said one or more side panels, said one or more top panels, and said bottom panel create a substantially enclosed area; and, a grounding mat arranged on said bottom panel of said shelter, and configured to dissipate static charge via a conductor connected to ground.

7. The animal shelter of claim 6 further comprising a sound absorbing baffle located within one of said one or more side panels, said baffle operatively arranged to allow air to flow in or out of said animal shelter.

8. The animal shelter of claim 6 further comprising one or more vibration damping feet coupled to said bottom panel.

9. The animal shelter of claim 6 further comprising a fan coupled to said animal shelter, said fan configured to circulate air within said substantially enclosed area and further configured to introduce sound into said substantially enclosed area.

10. The animal shelter of claim 6 further comprising a speaker coupled to said animal shelter, said speaker configured to introduce sound into said substantially enclosed area.

11. The animal shelter of claim 10, wherein said speaker is configured to receive audio signals transmitted wirelessly.

12. The animal shelter of claim 6, wherein the door comprises a third air pocket therein, the third air pocket defined by a hollow spaced formed between an outer wall and an inner wall of the door.

13. The animal shelter of claim 6, wherein the grounding mat is configured to be electrically connected to a surge protector and said surge protector configured to be electrically connected to said ground.

14. The animal shelter of claim 12, further comprising a flexible gasket arranged to form a seal between said door and said one or more side panels when said door is in a closed position.

15. The animal shelter of claim 14, wherein said flexible gasket comprises an embedded magnetic strip, and wherein said one or more side panels comprises a ferromagnetic strip, such that said door is magnetically and releasably coupled to said one or more side panels when in the closed position.

* * * * *